(12) United States Patent
Caputo et al.

(10) Patent No.: US 11,954,650 B2
(45) Date of Patent: Apr. 9, 2024

(54) MANAGING IN-PERSON PROPERTY ACCESS USING GEOFENCES

(71) Applicant: MFTB Holdco, Inc., Seattle, WA (US)

(72) Inventors: Michael P. Caputo, Aurora, IL (US); Scott E. Woodard, New Buffalo, MI (US); Paul G. Bergman, Chicago, IL (US); David C. Bernhard, Downers Grove, IL (US)

(73) Assignee: MFTB Holdco, Inc., Seattle, WA (US)

( * ) Notice: Subject to any disclaimer, the term of this patent is extended or adjusted under 35 U.S.C. 154(b) by 0 days.

(21) Appl. No.: 18/092,271

(22) Filed: Dec. 31, 2022

(65) Prior Publication Data

US 2023/0140029 A1 May 4, 2023

Related U.S. Application Data

(63) Continuation-in-part of application No. 17/853,222, filed on Jun. 29, 2022, now Pat. No. 11,676,227, and
(Continued)

(51) Int. Cl.
*G06Q 10/1093* (2023.01)
*G06Q 50/16* (2012.01)

(52) U.S. Cl.
CPC ....... *G06Q 10/1095* (2013.01); *G06Q 50/167* (2013.01)

(58) Field of Classification Search
CPC .. G06Q 10/1095; G06Q 50/167; G06Q 50/16; G07C 9/00309; G07C 9/215;
(Continued)

(56) References Cited

U.S. PATENT DOCUMENTS

| 5,014,049 A | 5/1991 | Bosley |
| 5,245,652 A | 9/1993 | Larson et al. |

(Continued)

OTHER PUBLICATIONS

Allen, Marcus, and Justin Benefield. "Technology in residential brokerage: Showing appointment scheduling services, property prices, and marketing times." Journal of Real Estate Practice and Education 15.1 (2012): 1-17. (Year: 2012).*

(Continued)

*Primary Examiner* — Carrie S Gilkey
(74) *Attorney, Agent, or Firm* — VLP Law Group LLP; James A. D. White

(57) ABSTRACT

The described techniques relate generally to managing in-person access of users to physical properties based at least in part on tracking geographical locations of devices of the users, such as by using one or more geofences created around a physical property to provide authorized users with temporary access to the physical property based at least in part on tracked geographical locations of devices of the users. In some situations, a specialized server provides information to a user's mobile device about the geofence(s), and the mobile device notifies the specialized server when it breaches one or more of the geofences. The specialized server may perform further related activities, such as perform tracking of locations of users as they move around a physical property, and further analyzing the tracked location information to determine associated information and initiate corresponding additional automated activities.

27 Claims, 19 Drawing Sheets

Related U.S. Application Data a continuation-in-part of application No. 17/114,608, filed on Dec. 8, 2020, now Pat. No. 11,580,503, which is a continuation-in-part of application No. 17/078,941, filed on Oct. 23, 2020, now Pat. No. 11,379,938, said application No. 17/853,222 is a continuation of application No. 17/078,941, filed on Oct. 23, 2020, now Pat. No. 11,379,938, which is a continuation of application No. 16/020,733, filed on Jun. 27, 2018, now Pat. No. 10,885,596.

(58) Field of Classification Search
CPC ... G07C 9/27; G07C 9/28; G07C 9/20; G07C 2009/00484; H04L 12/2816; H04W 4/021
See application file for complete search history.

(56) References Cited

U.S. PATENT DOCUMENTS

| | | | |
|---|---|---|---|
| 5,280,518 A | 1/1994 | Danler et al. | |
| 5,475,375 A | 12/1995 | Barrett et al. | |
| 5,612,683 A | 3/1997 | Trempala et al. | |
| 5,705,991 A | 1/1998 | Kniffin et al. | |
| 5,974,406 A | 10/1999 | Bisdikian et al. | |
| 6,101,480 A | 8/2000 | Conmy et al. | |
| 6,157,315 A | 12/2000 | Kokubo et al. | |
| 6,300,873 B1 | 10/2001 | Kucharczyk et al. | |
| 6,385,541 B1 | 5/2002 | Blumberg | |
| 6,496,776 B1 | 12/2002 | Blumberg et al. | |
| 6,522,875 B1 | 2/2003 | Dowling et al. | |
| 6,594,633 B1 | 7/2003 | Broerman | |
| 6,624,742 B1 | 9/2003 | Romano et al. | |
| 6,636,803 B1 | 10/2003 | Hartz, Jr. et al. | |
| 6,727,801 B1 | 4/2004 | Gervasi et al. | |
| 6,842,105 B1 | 1/2005 | Henderson et al. | |
| 6,973,432 B1 | 12/2005 | Woodard et al. | |
| 7,009,489 B2 | 3/2006 | Fisher | |
| 7,058,395 B2 | 6/2006 | Dowling et al. | |
| 7,127,475 B2 | 10/2006 | Gotz et al. | |
| 7,191,058 B2 | 3/2007 | Laird et al. | |
| 7,193,503 B2 | 3/2007 | Fisher | |
| 7,292,844 B2 | 11/2007 | Dowling et al. | |
| 7,518,485 B2 | 4/2009 | Shuster | |
| 7,606,558 B2 | 10/2009 | Despain et al. | |
| 7,664,801 B2 | 2/2010 | Walker | |
| 7,728,711 B2 | 6/2010 | Shoenfeld | |
| 7,853,479 B2 | 12/2010 | Bengson | |
| 7,869,941 B2 | 1/2011 | Coughlin et al. | |
| 7,880,584 B2 | 2/2011 | Larson et al. | |
| 7,999,656 B2 | 8/2011 | Fisher | |
| 8,035,480 B2 | 10/2011 | Woodard et al. | |
| RE43,068 E | 1/2012 | Woodard et al. | |
| 8,145,352 B2 | 3/2012 | Woodard et al. | |
| 8,368,507 B2 | 2/2013 | Conreux et al. | |
| 8,385,897 B1 | 2/2013 | Yadav-Ranjan | |
| 8,451,088 B2 | 5/2013 | Fisher | |
| 8,649,486 B1 | 2/2014 | Kellogg et al. | |
| 8,754,744 B2 | 6/2014 | Woodard et al. | |
| 8,831,970 B2 | 9/2014 | Weik et al. | |
| 8,947,530 B1 | 2/2015 | Scalisi | |
| 8,971,506 B2 | 3/2015 | Kellogg et al. | |
| 9,194,157 B2 | 11/2015 | Bahar | |
| 9,208,466 B2 | 12/2015 | Fisher | |
| 9,311,656 B2 | 4/2016 | Barnes | |
| 9,460,480 B2 | 10/2016 | Woodard et al. | |
| 9,478,083 B2 | 10/2016 | Fisher | |
| 9,514,586 B2 | 12/2016 | Rogers et al. | |
| 9,536,359 B1 | 1/2017 | Gokcebay | |
| 9,659,334 B2 | 5/2017 | Fenn | |
| 9,659,424 B2 | 5/2017 | Huber et al. | |
| 9,761,071 B2 | 9/2017 | Woodard et al. | |
| 9,781,602 B1 | 10/2017 | Girdhar et al. | |
| 9,916,742 B2 | 3/2018 | Kuenze | |
| 9,978,192 B1 | 5/2018 | Nicosia et al. | |
| 9,990,787 B2 | 6/2018 | Capaldi-Tallon | |
| 10,026,248 B2 | 7/2018 | Woodard et al. | |
| 10,044,519 B2 | 8/2018 | Kasmir et al. | |
| 10,713,740 B1 | 7/2020 | Caputo | |
| 2002/0022980 A1 | 2/2002 | Mozayeny et al. | |
| 2002/0174090 A1 | 11/2002 | Dexter | |
| 2003/0038708 A1 | 2/2003 | Lund | |
| 2003/0154573 A1 | 8/2003 | Gould | |
| 2003/0179075 A1 | 9/2003 | Greenman | |
| 2005/0149432 A1 | 7/2005 | Galey | |
| 2005/0168320 A1 | 8/2005 | Henderson et al. | |
| 2005/0192930 A1 | 9/2005 | Hightower et al. | |
| 2005/0288958 A1 | 12/2005 | Eraker et al. | |
| 2006/0106628 A1 | 5/2006 | Faherty et al. | |
| 2006/0220809 A1 | 10/2006 | Stigall et al. | |
| 2007/0100644 A1 | 5/2007 | Keillor et al. | |
| 2007/0143173 A1 | 6/2007 | Walker et al. | |
| 2007/0266081 A1 | 11/2007 | Murchison et al. | |
| 2007/0273474 A1* | 11/2007 | Levine | G05B 15/02 340/5.28 |
| 2007/0290798 A1 | 12/2007 | Larson et al. | |
| 2008/0168369 A1 | 7/2008 | Tadman et al. | |
| 2008/0169937 A1 | 7/2008 | Lowry | |
| 2011/0053557 A1 | 3/2011 | Despain et al. | |
| 2012/0290203 A1 | 11/2012 | King | |
| 2013/0005368 A1 | 1/2013 | Hunziker | |
| 2013/0262186 A1 | 10/2013 | Lazarre et al. | |
| 2013/0282524 A1 | 10/2013 | Appolito et al. | |
| 2014/0258042 A1 | 9/2014 | Butler et al. | |
| 2014/0304178 A1 | 10/2014 | Bengson et al. | |
| 2015/0077220 A1 | 3/2015 | Davis et al. | |
| 2015/0081327 A1 | 3/2015 | Mooker | |
| 2015/0235145 A1 | 8/2015 | Dubuc | |
| 2015/0348146 A1* | 12/2015 | Shanmugam | G06Q 20/3829 705/27.2 |
| 2016/0180620 A1 | 6/2016 | Eyring et al. | |
| 2016/0241999 A1 | 8/2016 | Chin et al. | |
| 2016/0275762 A1 | 9/2016 | Keunzi | |
| 2016/0364928 A1 | 12/2016 | Woodard et al. | |
| 2017/0193616 A1* | 7/2017 | Marshall | G06Q 30/0627 |
| 2018/0075681 A1 | 3/2018 | Scalisi et al. | |
| 2018/0165637 A1 | 6/2018 | Romero et al. | |
| 2018/0232978 A1 | 8/2018 | Schmidt-Lackner et al. | |
| 2019/0130352 A1 | 5/2019 | Ivester | |
| 2019/0156406 A1* | 5/2019 | Landau | G07C 9/30 |
| 2019/0244455 A1 | 8/2019 | Kim et al. | |
| 2019/0327448 A1 | 10/2019 | Fu et al. | |

OTHER PUBLICATIONS

"Technology in Residential Brokerage: Showing Appointment Scheduling Services, Property Prices, and Marketing Times", Marcus T. Allen et al., Journal of Real Estate Practice and Education vol. 15, No. 1, 2012, 17 pages.

Key Maker App, retrieved on Aug. 26, 2016, from https://www.key.me/app, 6 pages.

Minutekey, retrieved on Aug. 26, 2016, from https://www.minutekey.com/, 8 pages.

Cao et al., "Realmedia: Providing Multimedia-Based Real-Estate Services Through the Internet", Automation in Constructions 10, 2001, 15 pages (275-289).

* cited by examiner

MANAGING IN-PERSON PROPERTY ACCESS USING GEOFENCES

CROSS-REFERENCE TO RELATED APPLICATIONS

This application is a continuation-in-part of co-pending U.S. patent application Ser. No. 17/853,222, filed Jun. 29, 2022 and entitled "Managing Real Estate Listing Showings Based On Multiple Factors"; and is a continuation-in-part of co-pending U.S. patent application Ser. No. 17/114,608, filed Dec. 8, 2020 and entitled "System And Method For Managing And Automatically Rescheduling Showings Of Real Estate Listings Based On Multiple Factors", each of which is hereby incorporated by reference in its entirety. U.S. patent application Ser. No. 17/853,222 is a continuation of U.S. patent application Ser. No. 17/078,941 and U.S. patent application Ser. No. 17/114,608 is a continuation-in-part of U.S. patent application Ser. No. 17/078,941, with U.S. patent application Ser. No. 17/078,941 filed Oct. 23, 2020 and entitled "System And Method For Managing Real Estate Listing Showings Based On Multiple Factors", now U.S. Pat. No. 11,379,938, and which is hereby incorporated by reference in its entirety. U.S. patent application Ser. No. 17/078,941 is a continuation of U.S. patent application Ser. No. 16/020,733, entitled "System And Method For Managing Showings Of Real Estate Listings Based On Multiple Factors" and filed Jun. 27, 2018, now U.S. Pat. No. 10,885,596, which is hereby incorporated by reference in its entirety to provide continuity of disclosure. This application is related to U.S. patent application Ser. No. 14/230,723, entitled "System And Method For Managing Showing Of Real Estate Listing" and filed Mar. 31, 2014, which is hereby incorporated by reference. This application is related to U.S. patent application Ser. No. 15/669,712, entitled "Integrated Real Estate Showing Scheduling And Key Management System" and filed Aug. 4, 2017, now U.S. Pat. No. 10,026,248, which is hereby incorporated by reference. This application is related to U.S. patent application Ser. No. 13/755,510, entitled "System And Method For Utilizing Agent Location Information In Managing Real Estate Showings" and filed Jan. 31, 2013, which is hereby incorporated by reference, and which is a continuation-in-part of U.S. patent application Ser. No. 12/757,142, entitled "Integrated Real Estate Showing Scheduling And Key Dispensing System" and filed Apr. 9, 2010, which is hereby incorporated by reference, and which is a continuation-in-part of U.S. patent application Ser. No. 12/039,544, entitled "Showing Management System To Automatically Match And Control Electronic Lockboxes" and filed Feb. 28, 2008, now U.S. Pat. No. 8,035,480, which is hereby incorporated by reference.

TECHNICAL FIELD

The present invention relates generally to managing in-person access of users to physical properties based at least in part on tracking geographical locations of devices of the users, such as by using one or more geofences created around a physical property to provide authorized users with temporary access to the physical property based at least in part on tracked geographical locations of devices of the users.

BACKGROUND

Various techniques may be used to control access to a physical property, such as via lock and key. In some situations in which access to a property may be provided at certain times to users other than the owner (e.g., for tours of the property, such as for real estate showings), a property may have a lockbox attached to the property to use in retrieving a physical key, such that when the access is completed, the key is returned to the lockbox and the lockbox is closed for a next use. In other situations, a property may have an electronic lock, such as to unlock a door when an appropriate code or other information is provided without a separate physical key. However, various problems exist with such techniques for controlling physical property access.

A person of ordinary skill in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 10:
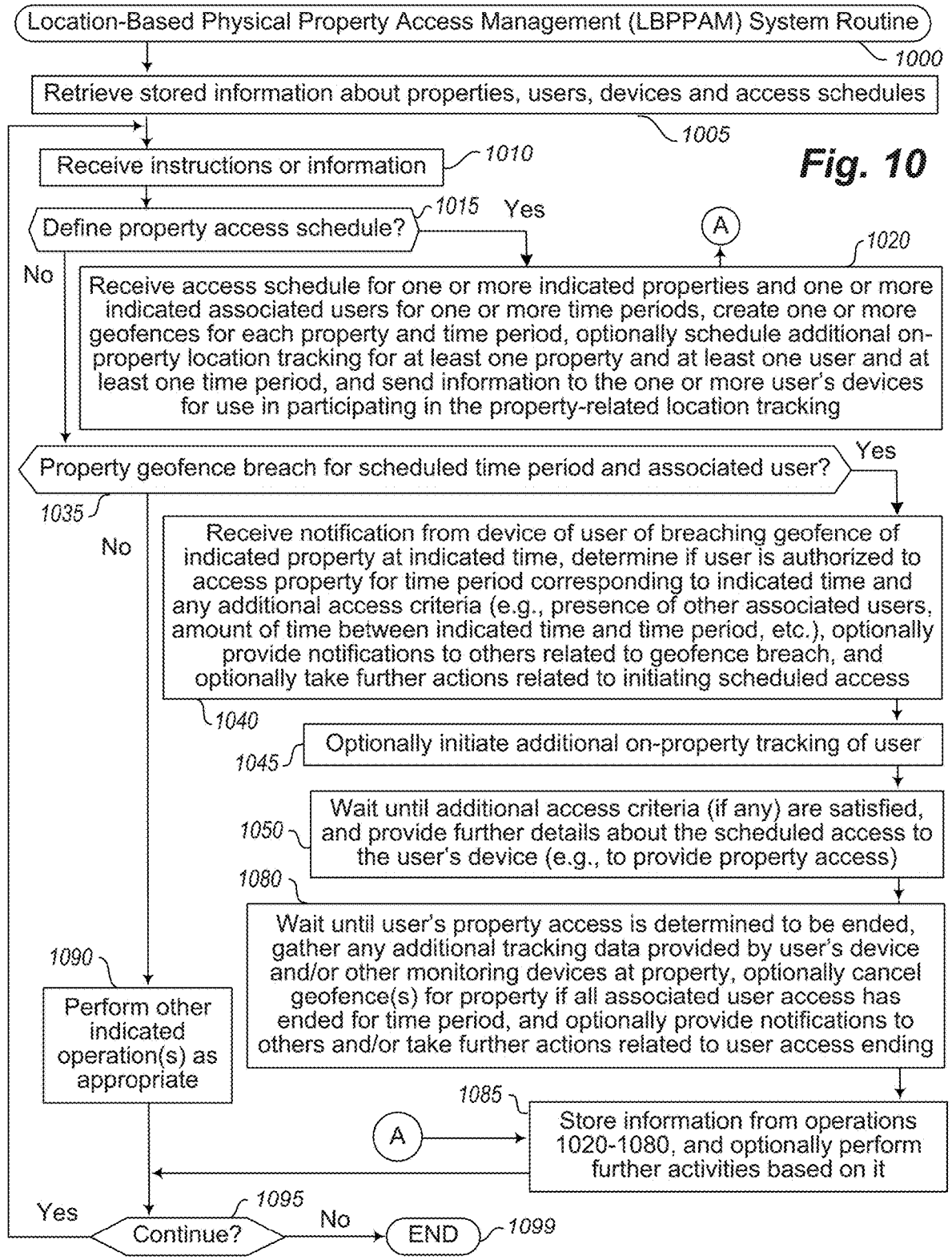
FIG. 10 is a flowchart of an example embodiment of a Location-Based Physical Property Access Management system routine in accordance with described techniques of the present disclosure.

Turning to the Figures, FIG. 10 illustrates a flowchart of an example embodiment of a Location-Based Physical Property Access Management (LBPPAC) system routine 1000 in accordance with described techniques of the present disclosure. In at least some embodiments, the routine may be implemented in part or in whole by a specialized server within a real estate showing management system, such as to manage temporary scheduled access by non-owner users to a real estate property (e.g., a house or other budding, or portion of a building such as an apartment or condominium), such as for house tours, appraisals, inspections, repairs, photographing or other data recording, etc., while in other embodiments the routine may manage access to other types of properties for other purposes. In addition, in at least some embodiments, each user for which temporary access to a physical property is managed may have at least one mobile device implementing one or more software applications or other sets of functionality to interact with the LBPPAC system (e.g., to each implement an LBPPAC client application, or 'app'), with the application(s) of each user's device(s) used in at least some embodiments and situations to determine when one or more geofences defined for a physical property have been breached, and/or to otherwise track locations and/or movements of the user in and around a property. When the LBPPAC system is managing temporary access to a real estate property for which users are authorized, the users may be of various types, such as to include one or more of the following: a potential buyer or other acquirer (e.g., renter; leaser, etc.); a buyer's agent that represents a potential buyer or other acquirer (also referred to at times herein as a 'showing agent'); an owner's agent that represents an owner of the property (also referred to at times herein as a 'listing agent'); a service provider user that provides a service related to the property (e.g., a property inspector, appraiser, repair person, photographer, other data collector, etc.); other user to whom temporary access is provided (e.g., for a short term renter, police, firefighters, etc.); etc., and similar types of users may be authorized to receive other types of temporary access to other types of properties.

As noted above, the LBPPAC system may in at least some embodiments perform automated operations to track locations and/or movements of each of one or more users at a physical property during a temporary scheduled access to the physical property, such as after at least a first geofence around the physical property has been breached by at least one of the users' mobile devices, and using the users' mobile devices and/or additional devices installed at or otherwise present at the physical property. Such tracking of locations and/or movements of a user and/or the user's mobile device in an around a property (e.g., inside a house or other building on the property) may include, for example, one or more of the following: using location determination services, such as based on one or more Bluetooth beacons placed at the property (e.g., as reported by an LBPPAC application executing on the mobile device to the LBPPAC system to indicate information such as at least a time of starting and/or ending receiving a corresponding transmitted Bluetooth signal from a particular beacon device using its unique ID), Wi-Fi signal-based location determination (e.g., as reported by an LBPPAC application executing on the mobile device to the LBPPAC system to indicate information such as at least a time of starting and/or ending receiving a corresponding transmitted Wi-Fi signal, such as from a particular Wi-Fi transmitter device using its unique ID), etc.; using an automated determination by the mobile device of its position based on analyzing information about the mobile device's surroundings and/or movement, such as based at least in part on visual data captured by a user's device (e.g., the mobile device or associated device) that is analyzed to determine a user's location within a building, optionally based on a combination of the acquired visual data and IMU (inertial measurement unit) data acquired by a device of the user (e.g., using SLAM (Simultaneous Location And Mapping) techniques and/or other related techniques; etc.) and/or matching elements of the surrounding areas that are identified from the analysis of the visual data to known information about the surrounding areas; using one or more additional geofences defined for a physical property that each covers only a part of the physical property (whether entirely separate parts or overlapping parts); etc. Additional details related to non-exclusive examples for determining the position of an image and/or device within a physical property (e.g., within a house or other building on the property) that may be used by the LBPPAC system are included in U.S. patent application Ser. No. 17/897,154, filed Aug. 27, 2022 and entitled "Automated Analysis Of Visual Data Of Images To Determine The Images' Acquisition Locations On Building Floor Plans"; and in U.S. patent application Ser. No. 17/872,914, filed Jul. 25, 2022 and entitled "Automated Tools For Incremental Generation Of Building Mapping Information"; each of which is incorporated herein by reference in its entirety.

As noted above, the LBPPAC system may in at least some embodiments use one or more defined geofences with a property to manage access to the property by authorized users at scheduled times. Such a geofence (also referred to at times herein as a 'geo-fence') is a geographical shape defined around one or more points (e.g., a circular or elliptical shape centered around one or more points at a property, a polygon or other defined shape enclosing some or all of a property, etc.)—the one or more points for a property may be, for example, a geographical center of the property, a designated point on the property (e.g., a front door), etc. After a mobile device is notified of a defined geofence, the mobile device may monitor its location and determine when its current location has crossed a boundary of the geofence (also referred to as 'breaching' the geofence), and optionally perform one or more follow-up activities (e.g., notify the LBPPAC system). In at least some embodiments and situations, an LBPPAC application executing on such a mobile device determines the breach of a geofence and notifies the LBPPAC system of the breach occurrence, such as in a substantially real-time manner (e.g., within milliseconds, seconds, etc.) or alternatively after some delay (e.g., at defined communication intervals, after a defined amount of time, when communication becomes available after being unavailable during the breach occurrence, etc.). The mobile device may determine its location in various manners, such as based on GPS coordinates and/or RFID (Radio Frequency ID) signals, and the boundaries of the geofence may be defined in similar manners (e.g., using GPS coordinates; the distance that the RFID signal travels from a transmitter and/or receiver, such that receipt of an RFID signal by a mobile device from a transmitter and/or receipt of an RFID signal by a receiver from the mobile device is the determination of the breach; etc.).

In at least some embodiments, breaching of a first geofence around a property by a mobile device of an authorized user may cause the LBPPAC system to perform one or more initial activities, such as to notify one or more other users (e.g., an owner and/or tenant of the property), so as to enable some or all of the notified users to leave the property and/or take other actions—such a first geofence may be defined to be at a distance from the property to allow such actions by the notified user(s) to take place (e.g., one or more miles, thousands of feet, hundreds of feet, etc.), or instead may be determined in other manners in other embodiments. In addition, breaching of one or more geofences around the property (e.g., the same first geofence and/or a second geofence closer to the property, such as near or at a property line, near or at a front door or other entrance, etc.) by an authorized user's mobile device may cause the LBPPAC system to perform one or more further activities, such as to provide access-related information to that mobile device—such a second geofence may be defined, for example, to be breached near a front door or other entry to the physical property. Such access-related information may include, for example, access instructions for use with a key controller device at the property (e.g., an electronic lockbox containing a physical key, an electronic lock, etc., such as an access code, instructions on how and/or where to provide biometric information and/or other types of access instructions, etc.) and/or related property showing instructions (e.g., identifications of areas of the property for which access is not permitted, information about how to access particular areas of the property, etc.)— in addition, by using a defined proximity to the property in such a manner, access to the property by the authorized user may be restricted and/or prevented by the LBPPAC system until the authorized user is at the property or otherwise within a defined distance of the property.

In addition, the LBPPAC system may further use one or more other criteria, whether instead of or in addition to a defined proximity to the property, to determine to provide some or all of the access-related information to the mobile device of the authorized user, with non-exclusive examples of such other criteria including one or more of the following: the presence of one or more other authorized users, such that the access-related information is provided when a group of multiple authorized users are within the defined proximity to the property (e.g., all of a plurality of authorized users; a minimum quantity of the plurality of authorized users; specific authorized users, such as at least authorized users X and Y, authorized user X and at least two of authorized users W, Y and Z; etc.), and with the presence of the other authorized users being determined in one or more manners (e.g., breaching of the same one or more geofences as a first authorized user; proximity to the mobile device of the first authorized user, such as determined by inter-device communication and/or detection, by information provided by such other authorized users to the mobile device of the first authorized user, etc.; etc.); timing-related criteria, such as relative to a scheduled access time (e.g., within a defined amount of time before and/or after some or all of the scheduled access time, such as the start of the scheduled access time); presence of one or more additional devices, such as carried by one or more of the authorized users to verify their identity (e.g., a security fob), such as via a transmitted electronic signal, a temporary use code, etc.; health-related information for the user, such as verified information from a monitoring device carried by the authorized user or at the property (e.g., vaccination status, temperature, etc.); an entrance or access notification from a key controller at the property, such as a lockbox opening and/or electronic lock usage; etc.

In addition, breaching of one or more geofences around the property (e.g., the same first and/or second geofences; one or more other geofences specific to particular subsets of the property, such as one or rooms; etc.) by an authorized user's mobile device may cause the LBPPAC system to perform one or more additional activities, such as to initiate tracking of locations and/or movement of the authorized user around some or all of the property during some or all of the scheduled access period (e.g., until the scheduled access period is completed and/or until the authorized user leaves the property, such as based at least in part on an automated determination by the LBPPAC system via one or more additional geofence departure breaches and/or corresponding key controller exit or departure notifications such as a lockbox closing); determination of entry by the authorized user to a restricted area to which access is not authorized, such as via breaching of an additional geofence covering that area; etc. —in addition, such tracking and determination activities may initiate other automated activities in at least some embodiments and situations, such as to initiate corrective action upon determination of entry by the authorized user to a restricted area to which access is not authorized, such as in a substantially real-time manner (e.g., transmit instructions to the mobile device of the authorized user to notify the authorized user to leave the restricted area; notify one or more other users, such as police or other security personnel of the access to the restricted area, etc.). Such tracking of locations and/or movement of the authorized user around some or all of the property may be performed in various manners in various embodiments, such as based at least in part on information determined by the authorized user's mobile device and reported to the LBPPAC system (e.g., via an LBPPAC client application executing on the mobile device) and/or by one or more additional devices at the property. Such additional devices at the property may include one or more of the following: one or more security cameras or other devices that capture and analyze visual data; one or more motion sensors; one or more beacon devices (e.g., Bluetooth beacons) or other devices that transmit wireless signals (e.g., Wi-Fi routers or other transmitters) received by the authorized user's mobile device; one or more reader or other receiver devices (e.g., RFID, NFC, etc.) that receive wireless signals transmitted by the authorized user's mobile device, and determine when such signal transmission receiving begins and ends; etc. —in addition, in some embodiments and situations, at least some of the additional devices may perform continuous or ongoing monitoring that begins before a scheduled access, and if so, the initiating of the tracking for such devices may include gathering corresponding tracked locations data from such devices after the tracking has occurred. In addition, as noted, the authorized user's mobile device may participate in such tracking of locations and/or movement of the authorized user around some or all of the property in at least some embodiments and situations, such as by interacting with devices at the property (e.g., receiving wireless signals from beacon devices and/or other transmitter devices, and determining when such signal transmissions begin and end; transmitting wireless signals to receiver devices; etc.) and/or based on data acquired by the mobile device and optionally additional related analysis (e.g., location data, such as GPS data and/or other location data; visual data and/or motion data, such as from one or more cameras and/or IMU sensors, respectively, and used to recognize the mobile device's location, such as using SLAM techniques; etc.) and/or based on breaching one or more additional geofences that each cover only a subset or portion of the property. Such mobile devices and property devices may provide location and/or movement data to the LBPPAC system at various times and in various manners, such as in a substantially real-time manner upon determination of the location and/or movement data, at scheduled or periodic times or otherwise after some delay, etc.

In addition, the LBPPAC system may further perform additional automated activities based on tracking the locations of one or more users for one or more scheduled accesses of a physical property, such as based at least in part on analysis of the tracked location information. As non-exclusive examples, analysis of tracking location information for a single user may include determining one or more of the following: identifying an area of the physical property that is of interest to the indicated user based at least in part on spending a determined amount of time in that area that is below a defined disinterest threshold; identifying an area of the physical property that is of disinterest to the indicated user based at least in part on spending a determined amount of time in that area that is below a defined disinterest threshold; identifying a restricted area of the physical property that the indicated user accesses despite being unauthorized to enter the restricted area; etc. In addition, as further non-exclusive examples, analysis of tracking location information for multiple users that are part of a group for a single scheduled access may include determining aggregate information for the multiple users by combining tracked location information for at least some of those multiple users to determine one or more of the following: identifying an area of the physical property that is of interest to the multiple users based at least in part on spending a determined aggregate amount of time in that area that is below a defined disinterest threshold; identifying an area of the physical property that is of disinterest to the multiple users based at least in part on spending a determined aggregate amount of time in that area that is below a defined disinterest threshold; identifying a restricted area of the physical property that the multiple users access despite being unauthorized to enter the restricted area; or determining aggregate movement patterns of the multiple users in the physical property; etc. As additional further non-exclusive examples, analysis of tracking location information for multiple users that are part of multiple scheduled accesses may include determining aggregate information for the multiple users by combining tracked location information for at least some of those multiple users to determine one or more of the following: identifying an area of the physical property that is of interest to the multiple users based at least in part on spending a determined aggregate amount of time in that area that is below a defined disinterest threshold; identifying an area of the physical property that is of disinterest to the multiple users based at least in part on spending a determined aggregate amount of time in that area that is below a defined disinterest threshold; identifying a restricted area of the physical property that the multiple users access despite being unauthorized to enter the restricted area; or determining aggregate movement patterns of the multiple users in the physical property; etc. The analyzed tracked location information may further be used by the LBPPAM system to perform additional automated activities in at least some embodiments, such as highlighting areas of determined interest for future scheduled accesses, improving areas of determined disinterest for future scheduled accesses, initiating further activities to prevent future access to restricted areas, initiating further activities to improvement movement flow patterns in the physical property, identifying and initiating further activities to extend areas of the physical property that are monitored by one or more devices at the physical property, etc.

Figure 5:
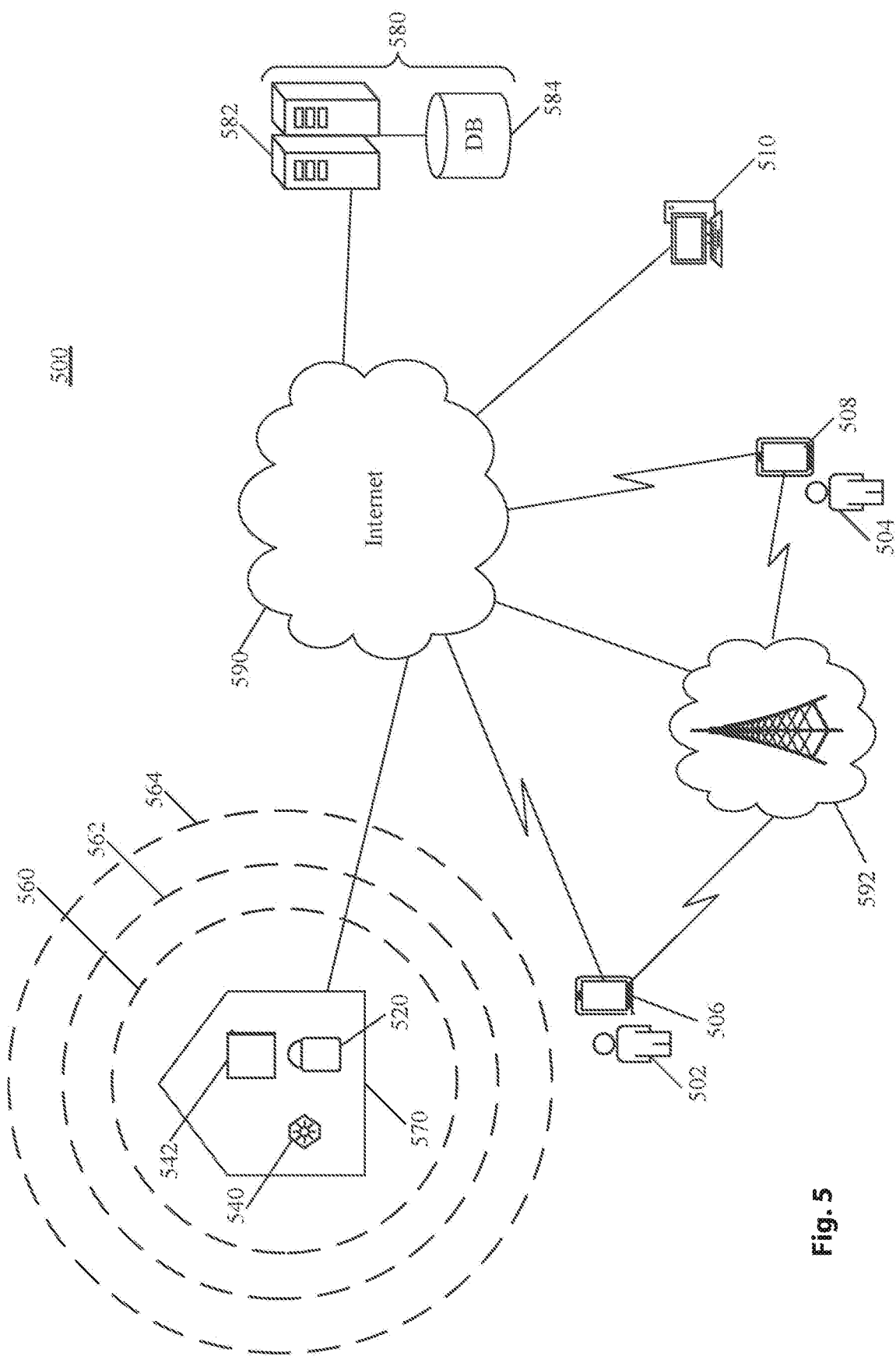
FIG. 5 is a simplified diagram depicting a communication system for managing real estate showings in accordance with the teachings of this disclosure.
Figure 16:
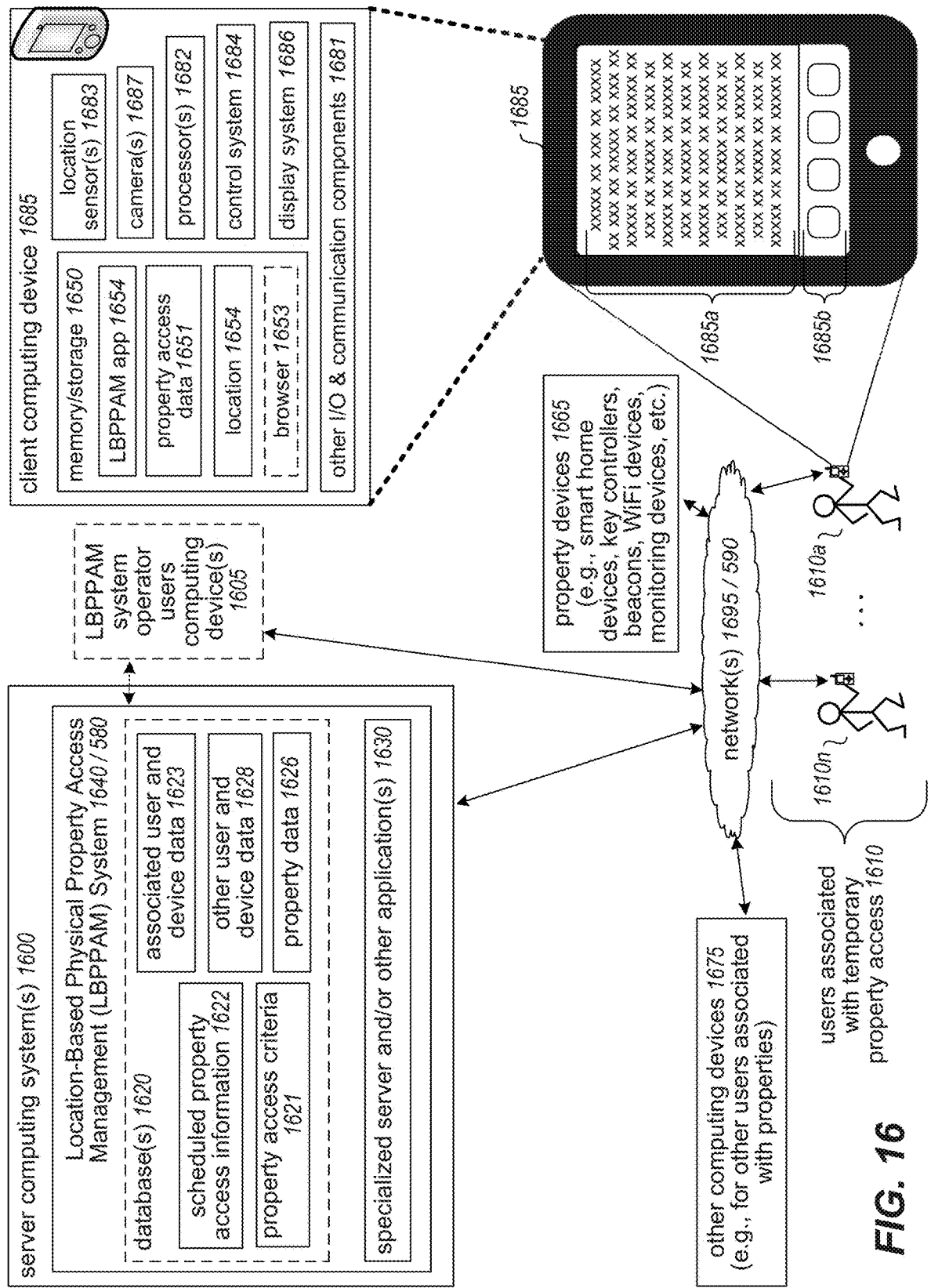
FIG. 16 is a block diagram illustrating computing systems and devices suitable for executing an embodiment of a system that performs at least some of the techniques described in the present disclosure.
Figure 17A:
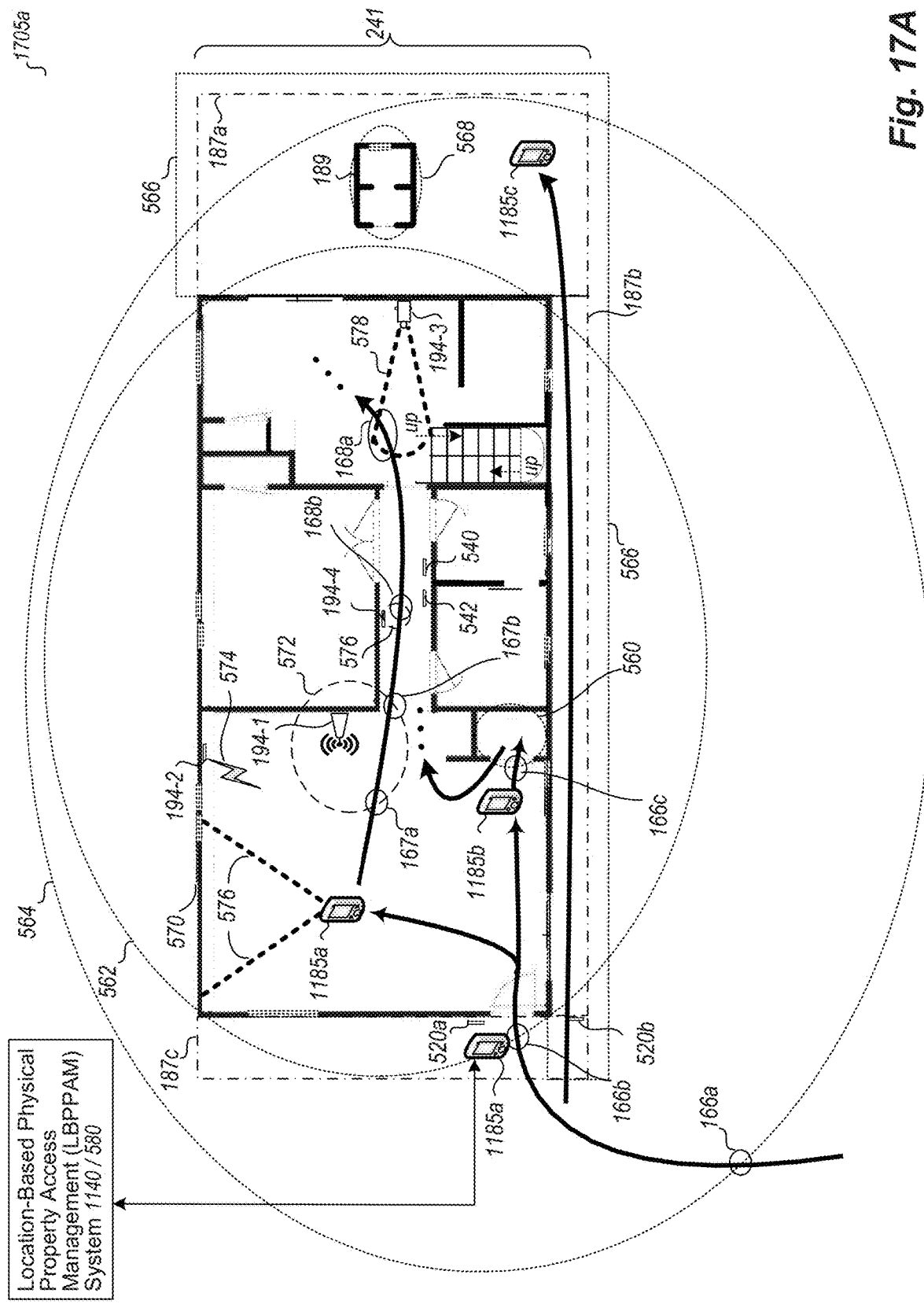
FIGS. 17A-17B illustrate examples of managing access of users to physical properties based at least in part on tracking geographical locations of devices of the users.
Figure 17B:
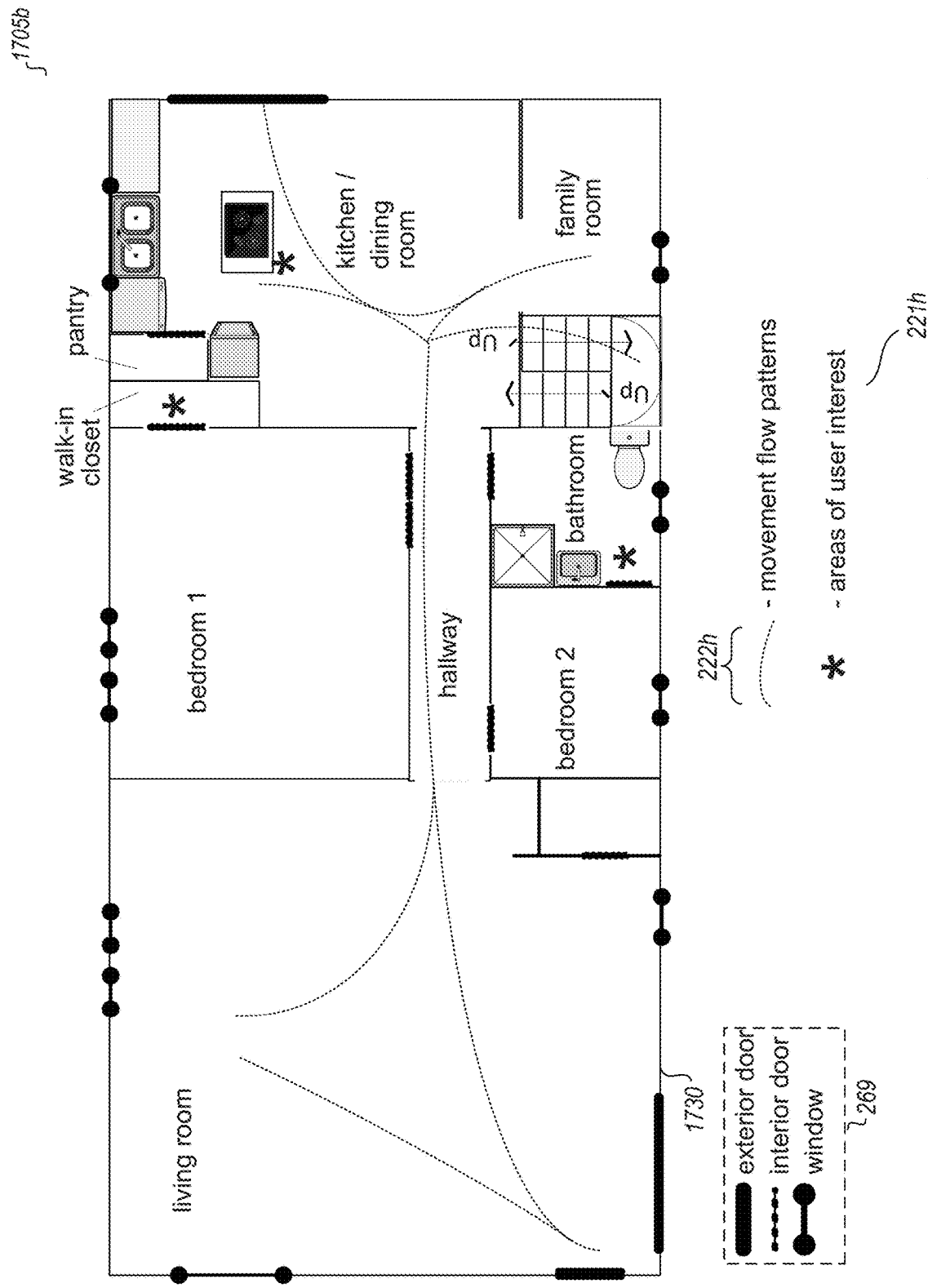

Returning back to FIG. 10, the routine may be performed by, for example, execution of the LBPPAM system 1640 of FIG. 16, the system 580 of FIG. 5, and/or an LBPPAM system as described with respect to FIGS. 17A-17B and elsewhere herein, such as to perform automated operations related to managing in-person access of users to physical properties based at least in part on tracking geographical locations of devices of the users, such as by using one or more geofences created around a physical property to provide authorized users with temporary access to the physical property based at least in part on tracked geographical locations of devices of the users. The illustrated routine 1000 begins at block 1005, where stored information about one or more properties, users, devices, and access schedules is retrieved for subsequent access. The routine continues to block 1010, where instructions or other information is received, such as by waiting at block 1010 for such information. In block 1015, the routine then determines if the instructions or other information received in block 1010 indicate to define a property access schedule, and if so continues to block 1020, where the routine receives one or more access schedules for one or more indicated properties and one or more indicated associated users for one or more time periods, proceeds to define one or more geofences for each property and time period, optionally schedules additional on-property location tracking activities for at least one of the properties and at least one of the users and at least one of the time periods, and sends information to the one or more users' mobile devices for use in participating in property-related location tracking for the scheduled property access.

Figure 1A:
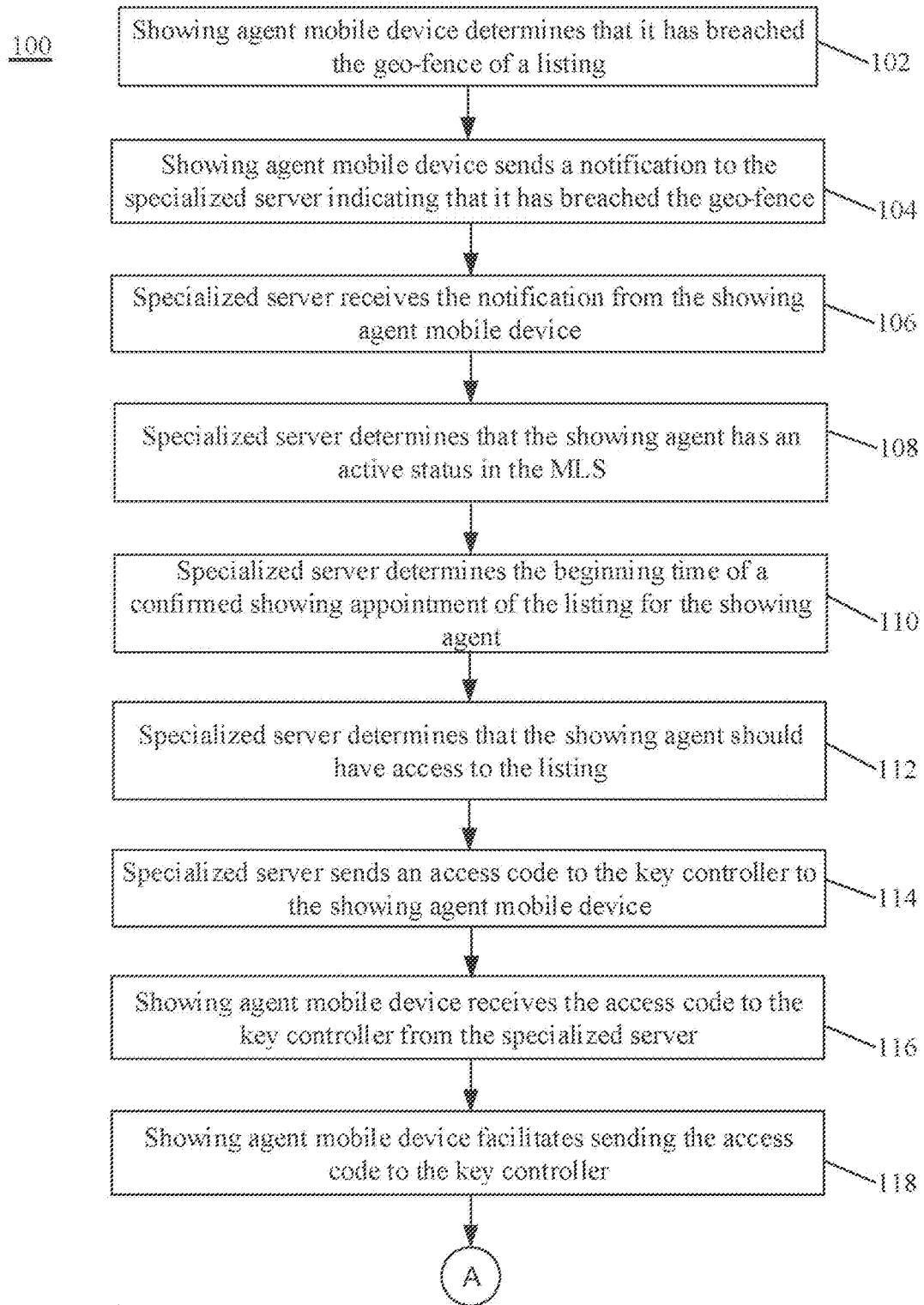
FIGS. 1A and 1B are a flowchart depicting a process by which the beginning of a showing of a listing is determined based on multiple factors in accordance with the teachings of this disclosure.
Figure 1B:
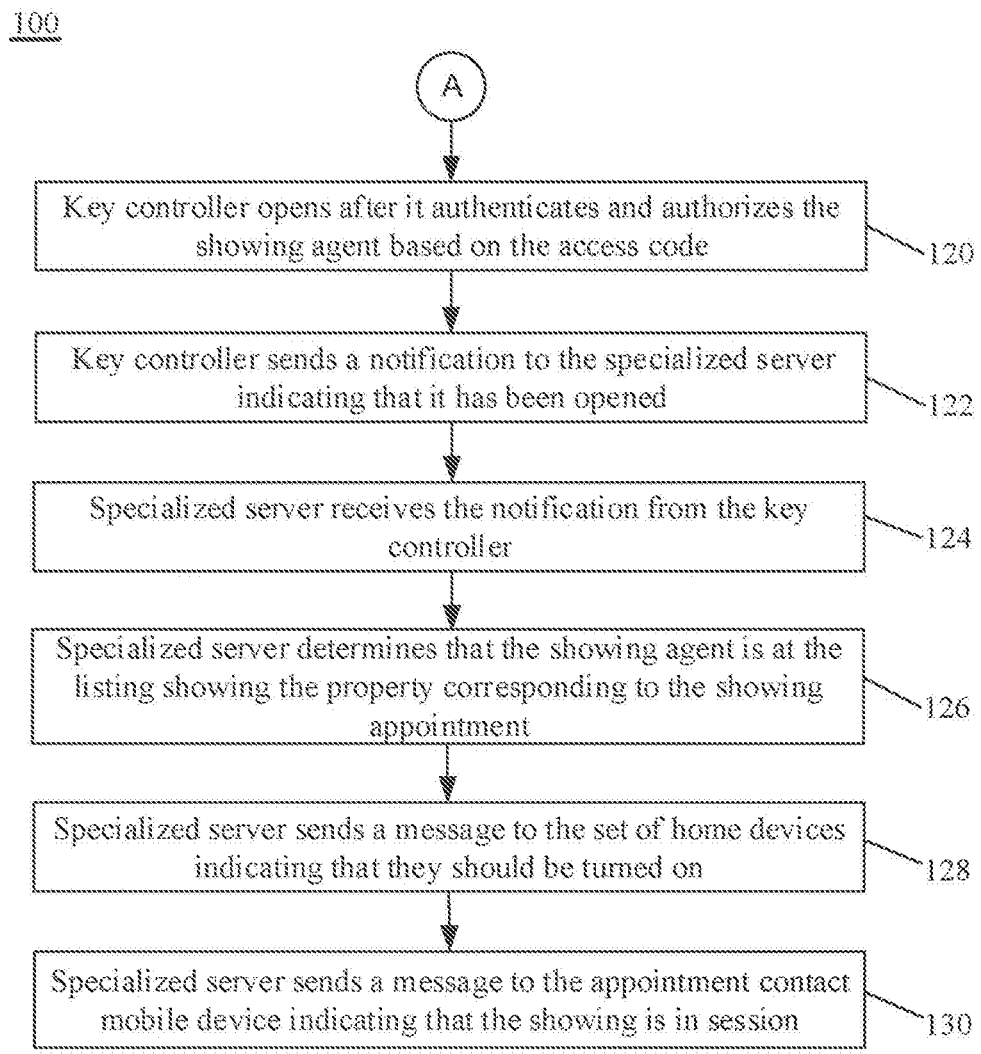
Figure 2:
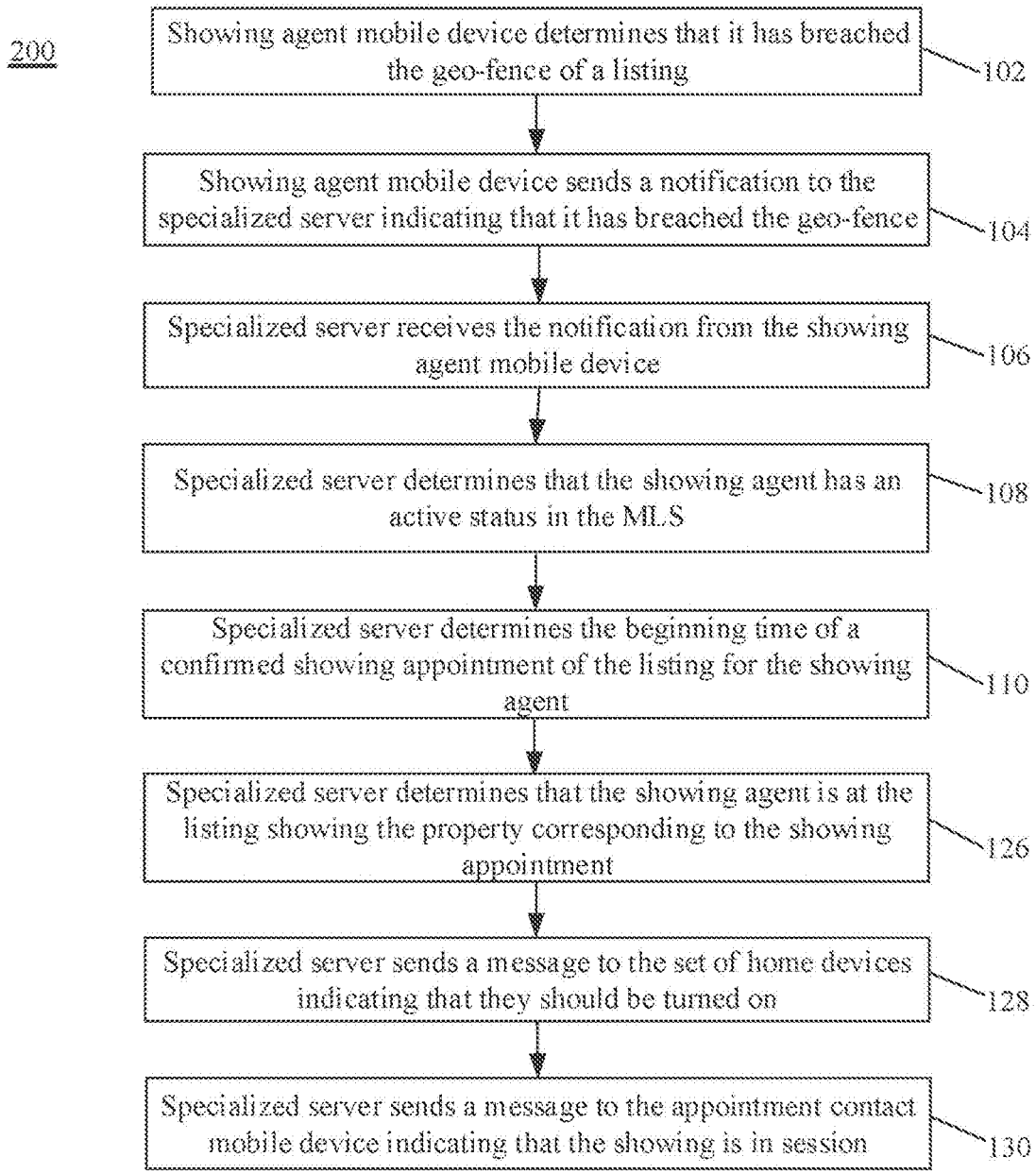
FIG. 2 is a flowchart depicting a process by which the beginning of a showing of a listing is determined based on multiple factors in accordance with the teachings of this disclosure.
Figure 3:
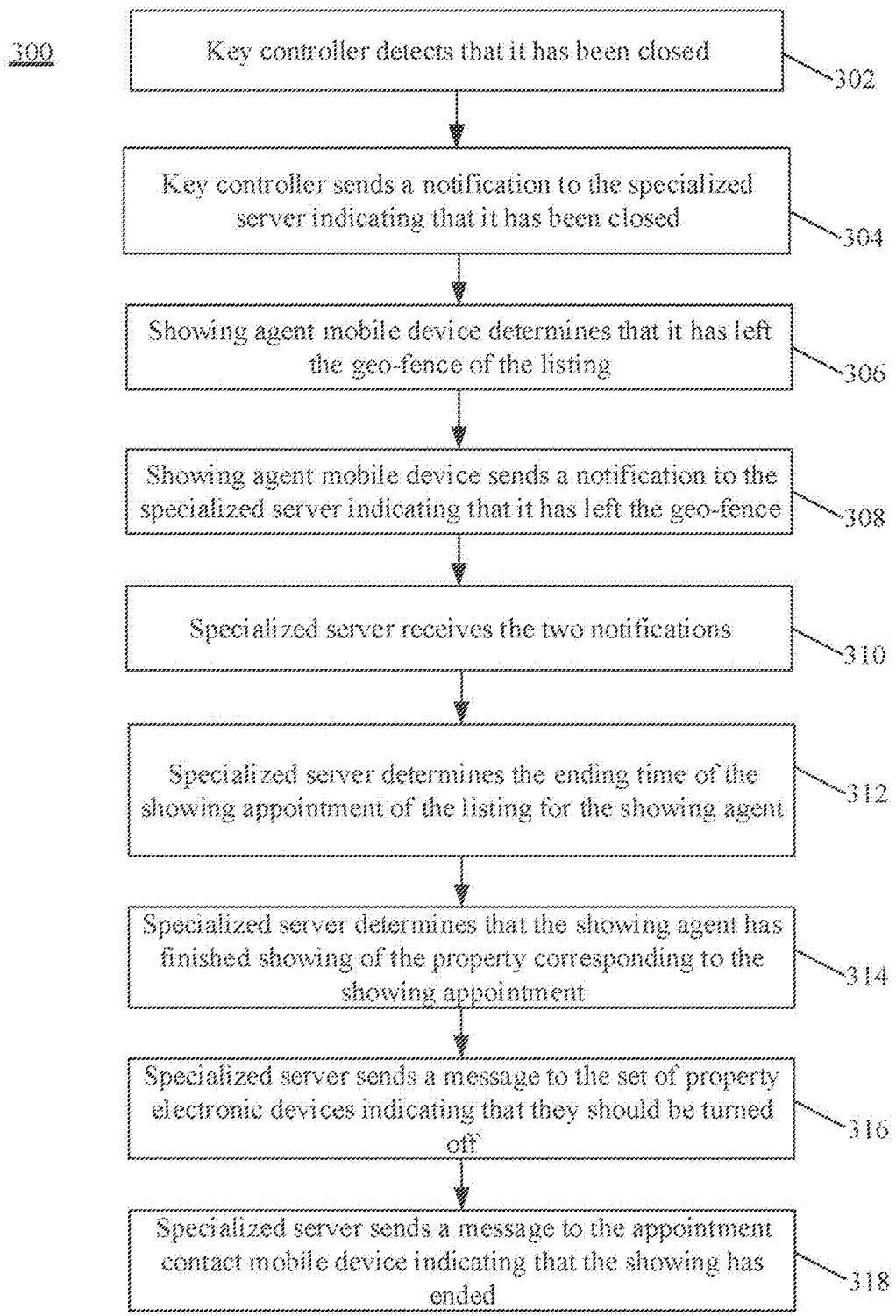
FIG. 3 is a flowchart depicting a process by which a notification of the conclusion of a showing of a listing is automatically provided based on multiple factors in accordance with the teachings of this disclosure.
Figure 4:
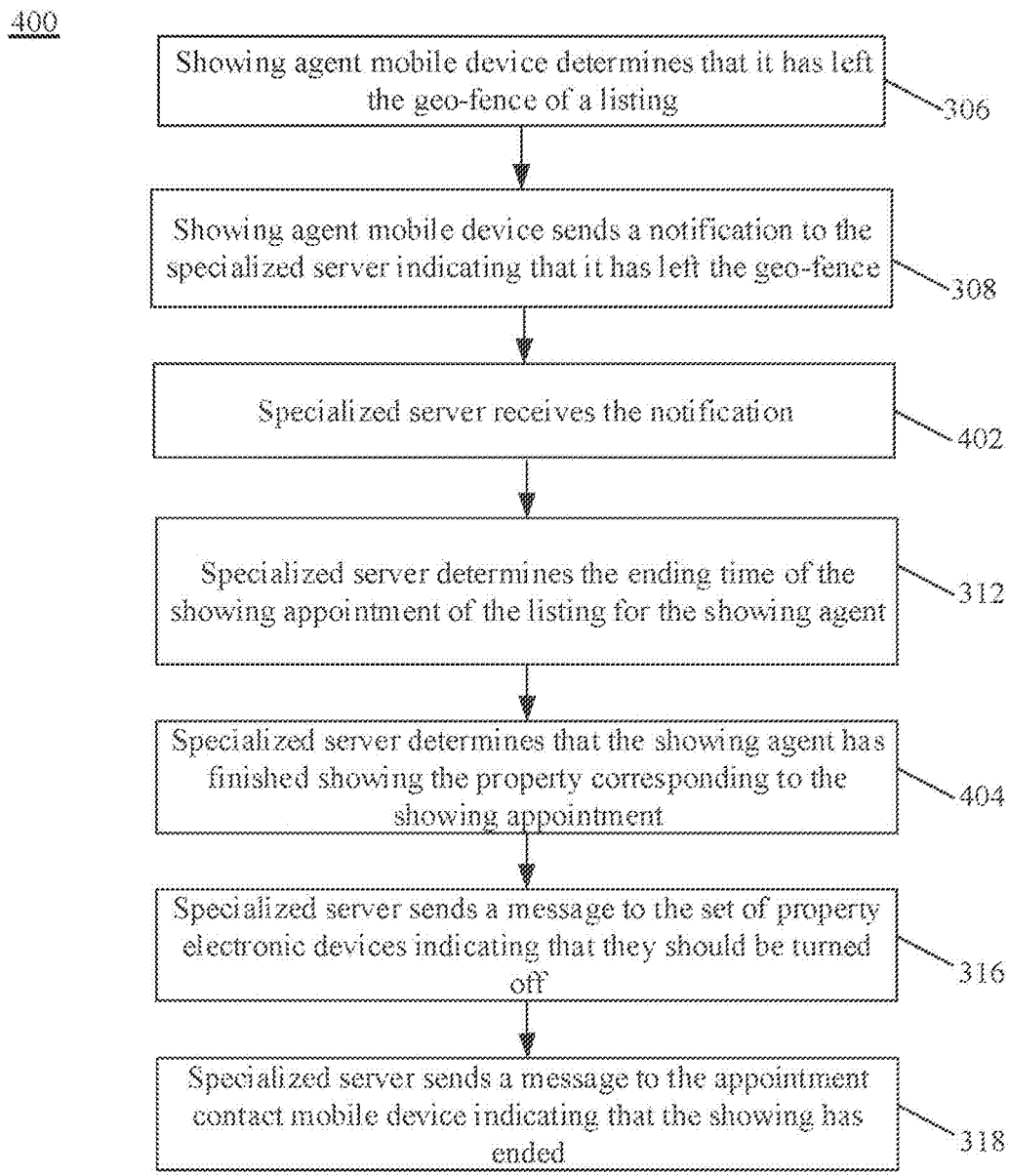
FIG. 4 is a flowchart depicting a process by which a notification of the conclusion of a showing of a listing is automatically provided based on multiple factors in accordance with the teachings of this disclosure.
Figure 7:
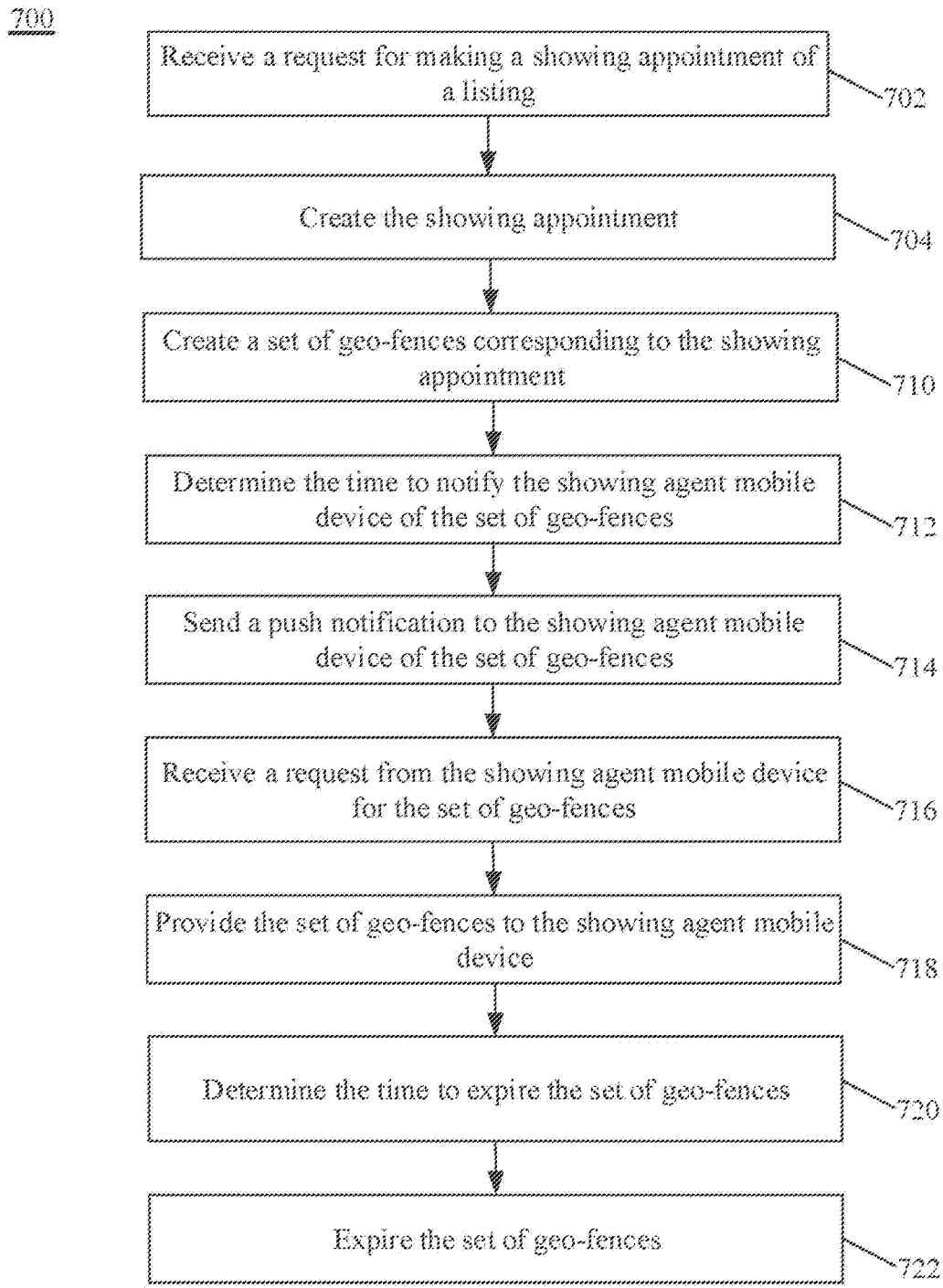
FIG. 7 is a flowchart depicting a process by which a specialized server within a real estate showing management system manages showing appointments and geo-fences in accordance with the teachings of this disclosure.
Figure 8:
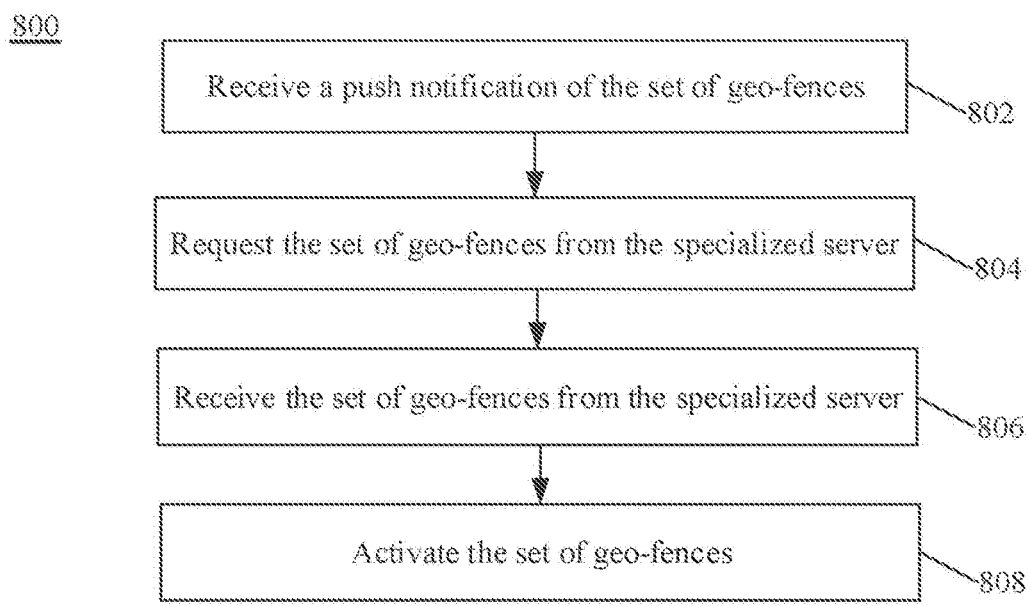
FIG. 8 is a flowchart by which a showing agent mobile device manages geo-fences in accordance with the teachings of this disclosure.
Figure 9:
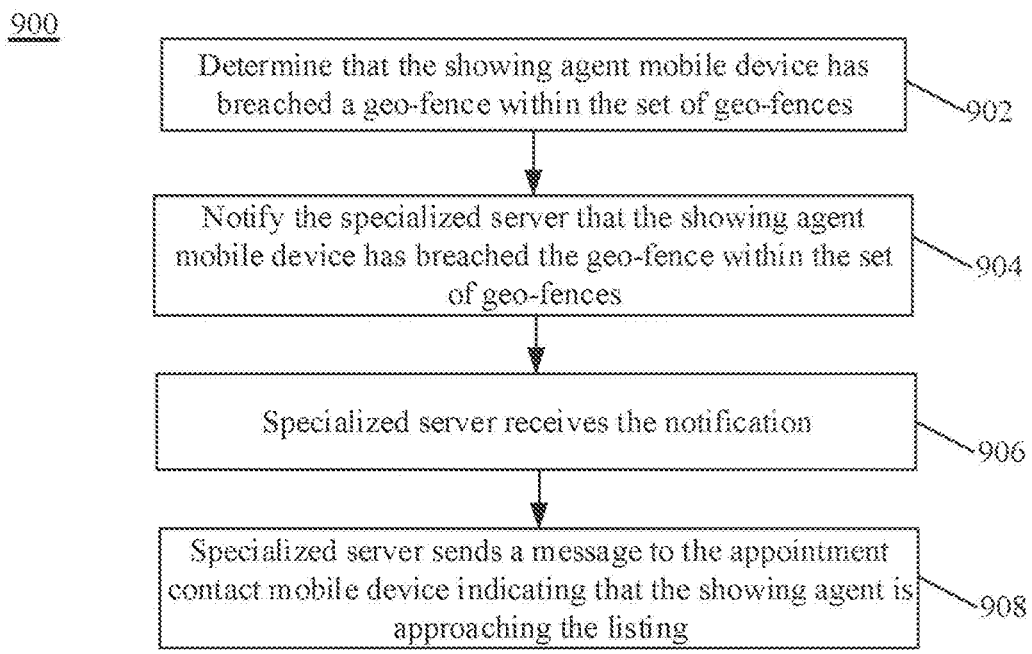
FIG. 9 is a flowchart depicting a process by which a specialized server within a real estate showing management system communicates with an appointment contact communication device when a showing agent mobile device breaches a first geo-fence in accordance with the teachings of this disclosure.

If it is instead determined in block 1015 that the instructions or other information received in block 1010 are not to define a property access schedule, the routine continues instead to block 1035, where it determines if the instructions or other information received in block 1010 indicate that defined property geofence has been breached for a scheduled time period and associated authorized user, such as by receiving a notification from that user's mobile device (e.g., from a client application of the LBPPAM system executing on the mobile device), and if so continues to block 1040. In 1040, the routine receives a notification from the mobile device of a user of breaching the geofence of an indicated property at an indicated time, determines if the user is authorized for access to the property for a time period corresponding to the indicated time, determines any additional access criteria (e.g., the presence of one or more other associated users, an amount of time between the indicated time and a scheduled access time period, etc.), optionally provides notifications to others related to the geofence breach (e.g., a tenant and/or owner of the indicated property), and optionally take further actions related to initiating the scheduled access. In block 1045, the routine then optionally initiates additional on-property tracking of the user, such as by activating one or more corresponding devices at the property and/or by providing corresponding instructions to the mobile device (e.g., to an LBPPAM client application executing on the mobile device). In block 1050, the routine then waits until additional access criteria (if any) are satisfied, and then provides further access-related information to the user's device (e.g., access instructions or codes, such as to enable property access to begin). In block 1080, the routine then waits until the authorized user's property access is determined to be ended, gathers any additional tracking data provided by the user's device and/or other monitoring devices at the property related to the user's location and/or movement during the access period, optionally cancels some or all geofences for the property (e.g., if all associated user accesses have ended for the time period), and optionally provides notifications to others related to the access ending and or takes further related actions. FIGS. 1A-1B and 2 provide examples of embodiments of routines for determining that scheduled access has begun in particular manners for particular embodiments, FIGS. 3-4 provide examples of embodiments of routines for determining that scheduled access has ended in particular manners for particular embodiments, FIG. 9 provides an example of notifying others about scheduled access occurring, and FIGS. 7-8 provide examples of further details of managing scheduled access in particular manners in particular embodiments, including via the use of geofences.

After blocks 1020 or 1080, the routine continues to block 1085, where it stores information from the operations performed in blocks 1020-1080, and optionally takes further activities based on that information, such as to provide some or all of the information to one or more other recipients or to analyze the information in one or more manners. Such further analysis or other activities may include, for example, one or more of the following: analyzing user location and/or movement patterns at the property of one or more users, such as to identify areas of a property of particular interest or disinterest based on that data; identifying unauthorized access to a property or portion of a property, such as to an area of a property that is not included in the authorized access (e.g., to an unauthorized room, such as based on breaching of a geofence corresponding to the perimeter of that room, via a monitoring device in the room, etc.); grouping data for multiple authorized users that are part of a single scheduled access, such as to determine and provide group-related information; etc.

If it is instead determined in block 1035 that the instructions or other information received in block 1010 are not related to a property geofence breach, the routine continues instead to block 1090 to perform one or more other indicated actions as appropriate. Such other actions may include, for example, one or more of the following: receiving and storing geofence data, such as related to breaches; receiving and storing location tracking data, such as from one or more devices at a property and/or from one or more mobile devices of authorized users; receiving and storing information about users and properties; etc. After blocks 1085 or 1090, the routine continues to block 1095 to determine whether to continue, such as until an explicit indication to terminate or only if an explicit indication to continue is received, and if it is determined to continue, the routine returns to block 1010, and otherwise continues to block 1099 and ends.

FIG. 16 is a block diagram illustrating computing systems and devices suitable for executing an embodiment of a system that performs at least some of the described techniques in some embodiments, such as to perform automated operations involving tracking geographical locations of devices of users by using one or more geofences created around a physical property to provide authorized users with temporary access to the physical property based at least in part on tracked geographical locations of devices of the users.

In particular, FIG. 16 illustrates example client users 1610 who each has a mobile client computing device 1685 that has one or more types of wireless communication capabilities, such as smartphone computing devices or other mobile computing devices (e.g., a tablet, laptop, etc.), although in other embodiments some or all such client devices may be fixed-location devices and/or may not support wireless communications. The handheld client computing device 1685 of example user 1610*a* is illustrated in additional detail, such as to include a smartphone device or tablet device with a touch-sensitive display. In this example, the display is separated into sections 1685*a* and 1685*b* by a graphical user interface ("GUI") displayed on the device 1685, with the portion 1685*b* being used in this example to provide user-selectable functionality controls (e.g., buttons or icons), and the separate portion 1685*a* being used to display or otherwise present various information to the user. It will be appreciated that in other embodiments a device may have other types of GUIs (or no GUI). In the illustrated embodiment, additional details are further shown regarding example internal components of the client device 1685. In particular, in this example, client device 1685 is suitable for performing at least some of the described techniques, such as by executing an embodiment of a Location-Based Physical Property Access Management ("LBPPAM") client application 1654 that interacts over one or more networks 1695/590 with an embodiment of the LBPPAM system 1640 executing on one or more server computing systems 1600—in other embodiments and situations, some or all of an LBPPAM system may instead execute on each of one or more client devices 1685. Various components of the client computing device 1685 are also illustrated in FIG. 16, including one or more hardware processors 1682 (e.g., CPUs, GPUs, etc.) that execute software (e.g., application 1654, optional browser 1653, etc.) using executable instructions stored and/or loaded on one or more memory/storage components 1650 of the device 1685, a display system 1686 (e.g., including one or more displays, optionally with touch-sensitive screens), one or more control systems 184 managing I/O (input/output) and/or communications and/or networking for the device 1685 (e.g., to receive instructions from and present information to an associated user) such as for the display and other device I/O and communication components 1681 (e.g., network interfaces or other connections, keyboards, mice or other pointing devices, microphones, speakers, GPS receivers, etc.), one or more location sensors 1683 (e.g., a GPS, or Global Positioning System, sensor or other position determination sensor), optionally other components, one or more cameras 1687, etc. The device 1685 may store and use various types of data during operation, such as property access data 1651, location data 1654, etc. In the illustrated embodiment, the client users 1610 may include, for example, acquirer showing agent users and/or listing agent users and/or acquirer users who access and use specialized functionality of the LBPPAM system available to them, including functionality related to participating in property tour scheduling and participation activities.

Other computing devices and systems may also interact with the LBPPAM system over the network(s) 1695/590 to receive and provide various types of functionality, such as the following: property devices 1665 at particular properties (e.g., smart home devices, key controllers, beacons, Wi-Fi devices, monitoring devices, etc.); other computing devices 1675 for other users (e.g., property owners and/or tenants, not shown); other computing systems (not shown) storing property data; optional computing devices 1605 used by system operator users (not shown) of the LBPPAM system, such as to perform operations to maintain the LBPPAM system and in some embodiments to assist in automated operations of the LBPPAM; optional other computing systems (not shown) to provide other functionality; etc.

In the illustrated embodiment, the LBPPAM system 1640/580 receives information from various users and devices, and performs automated operations related to tracking geographical locations of devices of users by using one or more geofences created around a physical property to provide authorized users with temporary access to the physical property based at least in part on tracked geographical locations of devices of the users. As part of doing so, the LBPPAM system may retrieve or otherwise obtain various information and store it for use, such as associated user and device data 1623 (e.g., from client computing devices 1685 for authorized users), other user and device data 1628 (e.g., from other computing devices 1675), property data (e.g., from devices 1665 and/or other sources of property data), information related to scheduled access to properties such as property access criteria data 1621 and scheduled property access information 1622 (e.g., from devices 1685 and/or 1675), etc. Other devices/systems 1605, 1665, 1675 and 1600 may each include various hardware components and stored information in a manner analogous to mobile device 1685, which are not shown in this example for the sake of brevity.

In the depicted computing environment of FIG. 16, the network 1695/590 may be one or more publicly accessible linked networks, possibly operated by various distinct parties, such as the Internet. In other implementations, the network 1695/590 may have other forms. For example, the network 1695/590 may instead be a private network, such as a corporate or university network that is wholly or partially inaccessible to non-privileged users. In still other implementations, the network 1695/590 may include both private and public networks, with one or more of the private networks having access to and/or from one or more of the public networks. Furthermore, the network 1695/590 may include various types of wired and/or wireless networks in various situations.

It will also be appreciated that the illustrated computing systems devices/systems 1605, 1665, 1675, 1600 and 1685 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smartphones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated LBPPAM system 1640/580 may in some embodiments be distributed in various components, some of the described functionality of the LBPPAM system 1640/580 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the LBPPAM system 1640 executing on server computing systems 1600, by the LBPPAM application 1654 executing on client computing devices 1685, etc.) and/or data structures, such as by execution of software instructions of the one or more software programs and/or by storage of such software instructions and/or data structures, and such as to perform algorithms as described in the flow charts and other disclosure herein.

Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

FIGS. 17A-17B illustrate an example of managing access of users to physical properties based at least in part on tracking geographical locations of devices of the users. In particular, FIG. 17A illustrates information 1705a about an example property 241 that includes a house 570 for which temporary access may be determined and provided by the LBPPAM system 1640. In this example embodiment, multiple geofences 560-568 are defined for the property for one or more scheduled access periods, such as a first geofence 564 at a farthest distance from the property, a second geofence 562 at a closer distance to the property, a third geofence 560 that corresponds to a subset of the property (in this example, a room inside the house), a fourth geofence 566 that corresponds to another subset of the property (in this example, part of the exterior of the property outside of the house, such as a side yard 187b and backyard 187a but not some or all of a front yard 187c), and a fifth geofence 568 that corresponds to another subset of the property (in this example, an outbuilding 189 on the property). In this example, a first authorized user (not shown) proceeds toward the property for a scheduled access period that includes one or more other authorized users, with the first authorized user carrying a mobile device 1685a. When the mobile device 1685a reaches the first geofence 564 at location 166a, a corresponding transmission is made by the mobile device (e.g., by an LBPPAM system client application, not shown, executing on the mobile device) to the LBPPAM system 1640/580 (e.g., at a remote location, not shown), with the system 1640 optionally taking one or more associated activities (e.g., notifying one or more other users, not shown) based on the geofence breach notification. As the first authorized user continues to and reaches a front of the house 570, the mobile device 1685a reaches the second geofence 562 at location 166b, and provides an associated notification to the LBPPAM system, and based at least in part on the breaching of the second geofence 562, the LBPPAM system in this example embodiment transmits access-related information to the mobile device 1685a, such as an access code for the first authorized user to use at an electronic key controller 520a near the front door of the property for use in gaining access to the house.

The LBPPAM system in this example embodiment may further initiate tracking of the first authorized user and his/her mobile device 1685a while at the property based at least in part on the geofence breach notification for geofence 562 and/or other access entry determination (e.g., via an entry notification from key controller 520a), such as via instructions provided to the mobile device 1685a and/or to one or more devices at the property. Such devices at the property may include, for example, smart home control devices 540 and/or 542, one or more camera devices 194-3, one or more motion sensors 194-2, one or more beacons or other transmitter devices 194-1, one or more reader or other receiver devices 194-4, etc. Accordingly, as the mobile device 1685a and first authorized user move throughout the house, the devices 194 may track some or all of their locations and/or movements, such as by the camera 194-3 tracking while the mobile device and/or first authorized user move 168a through an area at which they are visible within a field-of-view 578 of the camera, and/or by a receiver device 194-4 detecting when the mobile device moves 168b within a range 576 of the receiver device. Similarly, the mobile device 1685a may participate in the location and/or movement tracking, such as by using visual data acquired by a camera of the mobile device (e.g., using visual data from a field-of-view 576 of the camera while at a particular location near the middle of the first room, and continuing throughout as the mobile device moves, not shown), by detecting when the mobile device receives wireless transmissions from a transmitter device 194-1 in an area 572 of the wireless transmission coverage (such as when first receiving a transmission 167a and when the receiving of the transmission ends 167b), etc.

FIG. 17A further illustrates a second mobile device 1685b of a second authorized user that may move separately from the first authorized user as part of the same scheduled access period, and in this example has movement that breaches the third geofence 560 at location 166c, such as to indicate that the second authorized user has entered an unauthorized area of the property (e.g., a private closet or cupboard). Other breaches by the device 1685b of other geofences may be similarly determined and used but are not illustrated here, and other movements and/or locations of the device 1685b and/or the second authorized user at the property may similarly be determined and used, but are not illustrated here. This example further includes a third authorized user with a mobile device 1685c that has authorized access to only a portion of the property, which in this example is part of an exterior of the property that corresponds to the side yard and back yard, whether for the same schedule access period as the first and second authorized users, or a different scheduled access period. As one example, the third authorized user may be a repair person or service person that performs work in the exterior of the property, and may similarly receive access-related information to use with a separate key controller 520b for a gate to access the side yard, but without receiving access to enter the house 570. In some embodiments and situations, the group of the first and second authorized users (e.g., a potential property acquirer and associated buyer's agent) and/or the third authorized user may be permitted or not permitted to access the outbuilding 189, such as via use of geofence 568 to monitor access in a manner similar to that discussed with respect to some or all of the other geofences 560-566. It will be appreciated that a variety of additional types of tracking related activities may be performed in other embodiments and situations.

FIG. 17B continues the example of FIG. 17A, and includes information 1705b that illustrates information 221h that may be determined by the LBPPAM system via tracking of one or more authorized users (e.g., a plurality of authorized users over a plurality of scheduled access periods), such as in this example to include determined movement flow patterns throughout the house (e.g., aggregate movement flow patterns from multiple scheduled access periods) and determined areas of user interest, and with the information illustrated using corresponding visual indications 222h overlaid on a floor plan for a first story of the house 570. It will be appreciated that a variety of additional types of information may be determined and used in various manners, and that determined information may be presented and otherwise provided in a variety of manners.

Various details are provided in the examples of FIGS. 10 and 16-17B, but it will be appreciated that these details are non-exclusive examples included for illustrative purposes, and that other embodiments may be performed in other manners without some or all such details, with the described techniques not being limited to these details.

As noted above, the LBPPAC system may in some embodiments be implemented in part or in whole by a specialized server within a real estate showing management system. Such a real estate showing management system may manage and process real estate property listings (also referred to herein as listings), and showings of property listings at scheduled times. A listing may be a logical representation of a real estate property that has been put up for sale, renting or leasing (e.g., by a property owner) and may include various types of information, such as identification and contact information (such as a mobile telephone number and an Email address) of the owner and/or tenants and one or more listing agents of the underlying real estate property, a detailed property description (such as an address and features of the underlying real estate property), other details about the property (such as school information, tax information, marketing details, etc.), and showing instructions for showings. The listing agents, co-listing agents, showing agents and owners are also collectively referred to herein as appointment contacts. Appointment contacts of a listing may include other interested parties, without limitation to, a co-owner, a listing office of the listing, a tenant of the underlying real estate property, a bank, a mortgage company, an appraiser or an inspector. A showing appointment (also referred to herein as an appointment) for a property listing is a scheduled visit of the underlying real estate property by a showing agent (such as a real estate agent for a prospect buyer), the prospect buyer and/or another party (e.g., a professional inspector) and optionally one or more others (e.g., a listing agent). To schedule a showing, a showing agent, for instance, accesses a showing management system to request a showing appointment on a selected listing, with the showing appointment made on the calendar of an appointment contact (such as a listing agent, which is a real estate agent for the seller), and appointment contacts able to access the showing management system using a scheduling software application (e.g., ShowingTime Appointment Center™ and ShowingTime Front Desk™ software) to manage their calendars. For example, a listing agent may mark some time slots where he/she accepts showing appointments and indicates some other time slots where he/she does not accept showing appointments, and the showing management system additionally allows a listing-side contact (such as the listing agent, a co-listing agent, the seller, a tenant or an appointment manager) to indicate the procedure for the showings to be confirmed (e.g., no appointment required, confirmation by the seller required, etc.). After a showing appointment is requested, a request (through Email, telephone, text messaging, push notification, etc.) for confirmation is sent to the appointment contact if a confirmation is required, and if so, when the confirmation is received from the listing agent, the showing management system notifies the showing agent that his/her appointment has been confirmed or accepted, and stores information about the showing appointment (e.g., in a database). It should be noted that the appointment contact may in at least some embodiments and situations decline the showing request—in such a case, a decline is received from the listing agent, and the showing agent is notified of the decline. The time of a scheduled showing is referred to herein as a showing appointment time with a beginning time, and a length and/or end time (or an ending time), such as 1:00 PM to 1:30 PM on Jun. 4, 2018. The showing appointment may also indicate the listing and the showing agent, and have a status such as confirmed. Usually, the showing agent accesses the property and shows the property to his/her client (such as a prospect buyer) at or around the showing appointment time. The showing agent visits the property, optionally obtains one or more physical keys for one or more locks at the property (e.g., opens an electronic lockbox attached to the property) or otherwise provides access information supplied to the showing agent (e.g., an access code for an electronic door lock at the property, biometric information which an electronic lock or associated reader device is configured to accept, etc.), and uses the key(s) or other access information to open the property for showing the property to a prospect buyer—such electronic lockboxes and electronic door locks are collectively referred to herein as key controllers. After the showing, the showing agent closes the door of the property, and if physical key(s) were previously retrieved and used, places the physical key(s) back into the key controller and closes the key controller. At the showing appointment time, the property may not be in the most attractive conditions to prospect buyers (e.g., the temperature inside the property may be too low on a cold winter day or too high on a hot summer day; it may be desirable to turn on music inside the property before the showing; lights inside and/or outside of the property may be off or dim; a door of the property may be locked; etc.). Accordingly, in at least some embodiments and situations, the showing management system may remotely operate the property facilities and accessories (such as a thermostat, lights, electronic doors, etc.) to put the property in a desirable condition as the showing appointment time approaches, such as based on the beginning and ending times of a showing appointment, although the actual start time and/or end time of the showing of the listing by the showing agent may be slightly different from the appointment time for various reasons (e.g., the showing agent is late for the appointment; the prospect buyer does not like the property at all and quickly ends the showing; etc.). After the showing appointment time, the showing management system oftentimes sends a request (such as a text message, an Email, a voice call, etc.) to the showing agent seeking feedback on the listing or confirmation of end of the showing, and notifies an appointment contact (such as the property owner) that the showing has ended once confirmation is received.

FIGS. 1A-1B illustrate a flowchart depicting a process by which a specialized server within a real estate showing management system determines that a showing agent is at a listing for showing the listing using multiple factors, and automatically operates the remote property as shown and generally indicated at 100. The specialized server and the real estate showing management system are further illustrated by reference to FIG. 5.

Turning to FIG. 5, a simplified block diagram of a communication system is shown and indicated at 500. The communication system 500 includes the Internet 590, a public cellular network 592, a real estate showing management system 580, a computer 510 (such as a laptop, a desktop, a smart phone, etc.) for accessing the system 580 to schedule a showing appointment for showing a property 570, a showing agent mobile device 506 operated by a showing agent 502, an appointment contact mobile device 508 operated by an appointment contact 504, a key controller 520 attached to or located close to the property 570, and a set of property electronic devices indicated at 540 and 542. The mobile devices (such as smartphones) 506-508 communicate with the system 580 over the Internet. The mobile devices 506-508 access the Internet via the cellular network 592, Wi-Fi routers, or other links. The showing agent 502 or a different person operates the computer 510 to access the system 580 over the Internet 590 for making a showing appointment for the showing agent 502 to show the listing 570 to a prospect buyer.

The real estate showing management system 580 includes a database 584 and one or more specialized servers 582. The database 584 stores appointment contacts, listings, showing appointments, and other real estate related data. The databases 584, such as relational databases, are operatively coupled to the specialized servers 582. The specialized servers 582 run a specialized server software application (e.g., comprising one or more computer programs) for scheduling showings, managing listings, performing processes disclosed herein and performing other tasks—in embodiments in which the system 580 implements some or all of the LBPPAC system, the specialized server software application (not shown in FIG. 5) may include or be part of the LBPPAC system (not shown in FIG. 5) executing on one or more of the specialized servers 582 (e.g., with the one or more specialized servers acting as the one or more computing systems 1600 of FIG. 16). The specialized server software application is physically housed in a single server or distributed across multiple servers within the system 580. Moreover, the system 580 may also integrates with or connects to one or more listing services (not shown) to update the database 584 of real estate property listings. In accordance with the present teachings, each specialized server 582 includes a processor, a network interface through which the server 582 accesses the Internet 590, and some amount of memory. The specialized server software application is executed by the processor to carry out new features disclosed herein and thus makes the servers 582 specialized servers.

The key controller 520, such as an electronic lockbox, is attached to the property 570. The showing agent 502 opens the key controller 520 to retrieve a key for opening the property 570. When the showing agent 502 ends her/his showing of the listing 570, she/he places the key back into the lockbox 520 and closes the lockbox 520. When the lockbox 520 is opened or closed, it sends a notification to a server system, such as a lockbox management system. The notification is also provided to the servers 582, either directly from the lockbox 520 or indirectly from the lockbox management system. As used herein, it is said that the notification from the lockbox 520 is sent to the specialized server 582. The notification further indicates the identifier of the showing agent 502 who opens and/or closes the lockbox 520, and the time of the opening or closing of it.

Alternatively, the key controller 520 is an electronic door lock attached to the property 570. The electronic door lock also sends a notification to the server 582 when it is opened and closed. The notification is a message indicates the identifier of the showing agent 502 who opens and/or closes the electronic door lock 520, and the time when the key controller 520 is opened or closed. As used herein, the key controller 520 is said to be associated with the listing 570.

Figure 6:
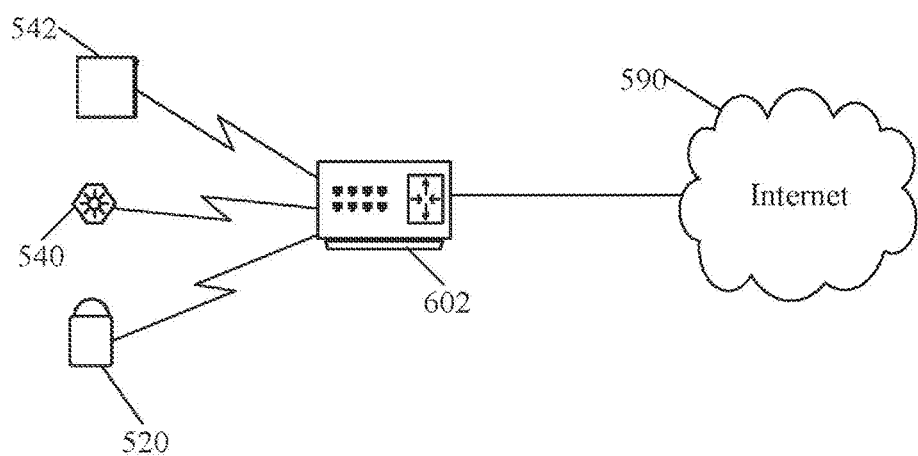
FIG. 6 is a simplified diagram depicting a communication system with property electronic devices communicating with the Internet via a central communication device in accordance with the teachings of this disclosure.

Inside the property 570, there are a set of property electronic devices, such as a lighting system, a refrigerator, a fireplace controller, a camera system, a thermostat, one or more Bluetooth beacon devices, one or more Wi-Fi devices, a sound system and other types of electronic systems and devices, etc., collectively indicated at 540-542. The property electronic devices 540-542 are operatively coupled to the Internet 590 and thus remotely accessible by the specialized server software application. The property electronic devices 540-542 accesses the Internet 590 either directly or through a central controlling device. The latter case is illustrated in FIG. 6, in which the property electronic devices 540-542 access the Internet 590 via a central communication device 602 (such as a computer running a specialized software application; a wireless router for accessing the Internet 590, such as by running a specialized computer program that bridges the communication between the property electronic devices 540-542 and the specialized servers 582; etc.). A set of one or more geo-fences around the listing 570 are indicated at 560, 562, 564, with each geo-fence being a virtual geographic boundary (e.g., a circle, a polygon, etc.) defined using global positioning system ("GPS") and/or radio frequency identification ("RFID") technological data. In one implementation in accordance with the present teachings, the set of geo-fences is created when the corresponding showing appointment is created. The creation and management of the set of geo-fences is further illustrated by reference to FIGS. 7 and 8, as well as in FIG. 10 and FIGS. 17A-17B.

Referring first to FIG. 7, a flowchart depicting a process by which the specialized server 582 creates and manages the set of geo-fences is shown and generally indicated at 700. At 702, the specialized server software application running on the server 582 receives a request for scheduling a showing appointment of the listing 570. For instance, this request is received from the computer 510, and the showing appointment is for the showing agent 502 to show the listing 570 to a customer (e.g., prospect buyer 504). At 704, the specialized server software application creates the showing appointment and stores it into the database 584. At 710, the specialized server software application creates a set of geo-fences around the listing 570, such as the one or more geo-fences 560-564, in response to the making of the showing appointment and for the date of the showing appointment time, and stored into the database 584—if multiple geo-fences are used, they are defined to differ in size and/or shape and/or center location.

At 712, the specialized server software application determines the time to notify the showing agent mobile device 506 of the set of geo-fences. In one implementation, one hour before the beginning time of the showing appointment is determined to be the time to send the set of geo-fences to the mobile device 506. At 714, the specialized server software application sends a notification message, such as a push notification, to the showing agent mobile device 506 indicating that the set of geo-fences should be downloaded now. In response, a specialized mobile software application running on the showing agent mobile device 506 (e.g., a client application of the LBPPAC system) sends a download request to the specialized server 582 (e.g., to be LBPPAC system). Thereafter, at 716, the specialized server software application receives the download request. In response, at 718, the specialized server software application provides the set of geo-fences to the mobile device 506.

At 720, the specialized server software application determines the time to expire the set of geo-fences. For example, the time to expire the set of geo-fences may be the end of the day of the showing appointment. At 722, at the determined time, the specialized server software application expires the set of geo-fences. In other words, the set of geo-fences is marked as inactive or deleted. The process by which the showing agent mobile device 506 retrieves the set of geo-fences is illustrated in FIG. 8.

Referring to FIG. 8, a flowchart depicting a process by which a showing agent mobile device retrieves a set of geo-fences is shown and generally indicated at 800. At 802, the specialized mobile software application running on the showing agent mobile device 506 receives the push notification for the set of geo-fences from the specialized server 582. At 804, the specialized mobile software application sends a request to the specialized server 582 for the set of geo-fences. At 806, the specialized mobile software application receives the set of geo-fences from the specialized server 582. At 808, the specialized mobile software application activates the set of geo-fences.

When it is time for the showing agent 502, she/he visits the property 570 carrying the mobile device 506. When the showing agent mobile device 506 goes into the virtual boundaries defined by the set of geo-fences, i.e., breaching the geo-fences, the specialized mobile software application detects the breach or is notified by the breach. In such a case, as used herein, the mobile device 506 is said to have detected the breach.

Returning to FIGS. 1A-1B, at 102, the specialized mobile software application determines that one of the geo-fences, such as the smallest geo-fence 560, within the set has been breached. At 104, the specialized mobile software application sends a message to the specialized server software application running on the server 582. The message notifies the server 582 that the showing agent mobile device 506 and the showing agent 502 are at the property 570 at the time of the message because they have breached the geo-fence 560. The notification message also indicates an identifier of the showing agent 502.

At 106, the specialized server software application receives the notification from the mobile device 506. At 108, the specialized server software application determines a member status of the showing agent 502 within the Multiple Listing Service ("MLS"). For instance, the showing agent 502 may need to be to an active member of the MLS in some embodiments and situations. At 110, the specialized server software application determines the beginning time of a confirmed showing appointment of the listing 570 for the showing agent 502. For example, the specialized server software application queries the database 584 to retrieve multiple showing appointments, including the showing appointment by the showing agent 502 of the property 570 around the time of the notification. For instance, all showing appointments of the showing agent 502 on the same day or within four hours of the notification may be retrieved. At 112, the specialized server software application determines that the showing agent 502 is at the listing 570 at the time of the showing appointment. For example, when the beginning time of the showing appointment and the time of the notification from the mobile device 506 are within a predetermined range of time (such as fifteen minutes or twenty minutes), the showing agent 502 is said to be at the property 570 at the time of the showing appointment and is authorized to have access to the listing 570. At 114, the specialized server software application sends an access code to the key controller 520 to the showing agent mobile device 506.

At 116, the specialized mobile software application receives the access code. At 118, the specialized mobile software application facilitates providing the access code to the key controller for authentication. For example, the specialized mobile software application displays the access code on a screen of the showing agent mobile device 506 and the showing agent 502 then enters it into the key controller 520. For instance, when the key controller 520 is a mechanical lockbox without network connection capabilities, the access code needs to be manually entered to the key controller 520 by the showing agent 502. As another example, the specialized mobile software application displays a button that when pressed by the showing agent 502 causes the specialized mobile software application to the access code to the key controller 520 over a wireless link (such as a Bluetooth link, a Wi-Fi link, etc.).

At 120, the key controller 520 receives the access code and opens when the showing agent 502 is authenticated and authorized. The key controller 520 may also receive other access information from the showing agent mobile device 506, such as the showing agent's identifier and the showing appointment data. When the access is authenticated and/or authorized, the key controller 520 opens and logs the access, such as by indicating the type of access (i.e., opening), an identifier of the showing agent 502, the time of access, the identification of the key controller, etc. At 122, the key controller 520 sends a message to the server 582 indicating that the key controller 520 has been opened by the showing agent 502, indicating an identifier of the listing 570 directly or indirectly. At 124, the specialized server software application receives the notification from the key controller 520. At 126, the specialized mobile software application determines that the showing agent 506 is at the listing 570 showing the property corresponding to the showing appointment based on the key controller notification, the time of the notification, the showing appointment, the geo-fence breach notification and the time of the geo-fence breach notification.

When the key controller 520 is a mechanical lockbox, it does not have network (such as the Internet) connection capabilities. In such a case, the element 122 is not performed; and, at 126, the specialized server software application determines that the showing agent 506 is at the listing 570 showing the property corresponding to the showing appointment based on the showing appointment, the geo-fence breach notification and the time of the geo-fence breach notification. In other words, at 126, the specialized server software application determines that the showing has started based on the showing appointment, the geo-fence breach notification and the time of the geo-fence breach notification. Alternatively, at 126, the specialized server software application determines that the showing has started based on a notification from the showing agent mobile device 506. This process is further illustrated by reference to FIG. 11.

Figure 11:
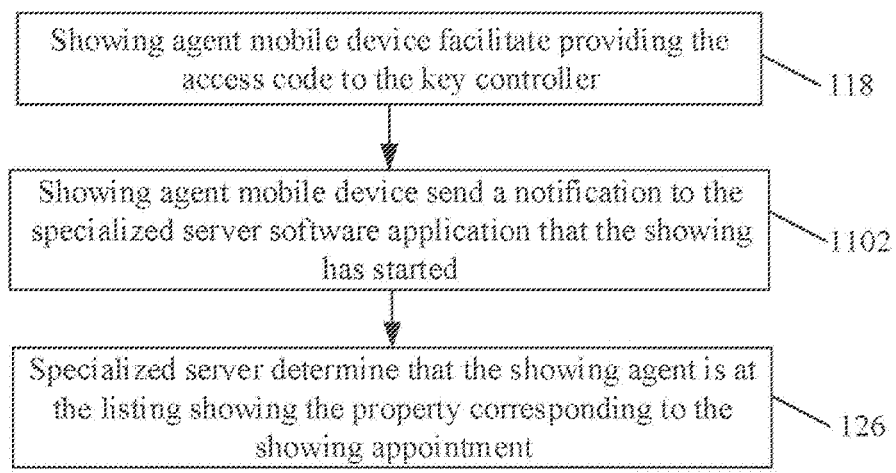
FIG. 11 is a flowchart by which a showing appointment management system determines that a showing has started in accordance with the teachings of this disclosure.

Referring now to FIG. 11, a flowchart illustrating a process by which the specialized server software application determines that a showing has started is shown and generally indicated at 1100. After the showing agent mobile device 506 facilitates providing the access code to the key controller 520, at 1102, the mobile software application sends a notification message to the specialized server software application that the showing has started. Based on the showing starting notification, at 126, the specialized server software application determines that the showing agent is at the listing showing the property corresponding to the showing appointment, and the showing has started.

At 128, the specialized server software application communicates with the property electronic devices 540-542 indicating that they should turn themselves on or set to a predetermined configuration. For example, a sound system, a lighting system, and a fireplace (or an air conditioner) turn themselves on to increase the marketability of the property. As another example, a smart thermostat sets the room temperature to a predetermined level. The predetermined level keeps the property warm in winter and cool in summer. It should be noted that property electronic devices can be remotely operated via a controller device, such as a thermostat for controlling the temperature inside the property 570. In such a case, the specialized server 582 communicates with the remote controller devices, such as the thermostat. In a further implementation, at 130, the specialized server software application sends a message to appointment contact mobile devices, such as the device 508, indicating that the showing corresponding to the showing appointment is in session.

In the process 100, the specialized server 582 determines that a showing corresponding to a showing appointment has started using multiple factors. The factors include the showing appointment, the geo-fence and the breach of the geo-fence, and the access to the key controller. Using the three factors significantly improves the accuracy of the determination that the showing agent is showing the property 570 now. For example, solely relying on the showing appointment's beginning time to determine that the showing agent 502 is showing the property 570 is not reliable, as the showing agent 502 may be late or early for the showing appointment, the showing agent 502 may forget about the showing appointment, etc. As another example, relying on the showing appointment and the geo-fence breach, but not key controller access, to determine that the showing agent 502 is showing the property 570 may not be accurate, as the showing agent 502 may be at the property 570 waiting for her/his client to show up for the showing. However, relying on the showing appointment and the geo-fence breach to determine that the showing agent 502 is showing the property 570 is still more accurate than conventional approaches because both the showing appointment and the geo-fence are considered in making the determination. The process by which the specialized server software application determines that the showing agent 502 is showing the property 570 corresponding to the showing appointment is shown in FIG. 2 and generally indicated at 200.

When the showing is completed, the specialized server software application also uses the showing appointment, the geo-fence and the key controller access to determine that the showing agent 502 has concluded her/his showing of the property 570 corresponding to the showing appointment. This process is further illustrated in FIG. 3 and generally indicated at 300. The showing agent 502 usually closes and locks the door of the property 570 after the showing. She/he then places the key back into the key controller and closes the key controller. At 302 of FIG. 3, the key controller 520 detects that it has been closed. At 304, the key controller 520 sends notification message to the specialized server software application indicating that it has been closed. At 306, the specialized mobile software application determines that the mobile device has left the geo-fence 560. At 308, the specialized mobile software application sends a message to the specialized server software application indicating that it has left the geo-fence 560. It means that the showing agent 502 has left the geo-fence 560 and the listing 570. The notification message also indicates an identifier of the showing agent 502.

At 310, the specialized server software application receives the two notifications from the key controller 520 and the device 506 respectively. Reception of the two notification messages can occur at close, but different times. At 312, the specialized server software application determines the ending time of the showing appointment. For example, it checks the showing appointment data record and retrieves the ending time. At 314, the specialized server software application determines that the showing corresponding to the showing appointment has ended. For instance, when the reception time of the notification from the device 506, the reception time of the notification from the key controller 520, and the ending time of the showing appointment are within a predetermined range of time (such as ten or thirty minutes), the specialized server software application regards the showing as have been concluded. When the key controller 520 is a mechanical lockbox that lacks the capability to connect to the Internet 590, the element 304 is not performed. In such a case, 314, the specialized server software application determines that the showing corresponding to the showing appointment has ended when the reception time of the notification from the device 506, and the ending time of the showing appointment are within a predetermined range of time. Alternatively, when the showing is over, the showing agent 502 operates the mobile software application running on the device 506 to send the specialized server software application a showing ended notification over the Internet 590. In response, at 316, the specialized server software application sends a message to the set of property electronic devices (such as 540-542) indicating that they should be turned off or set to a predetermined configuration since the showing has ended.

In a further implementation, at 316, the specialized server software application determines whether the showing appointment is the last showing appointment scheduled for the day of the showing appointment. If so, at 316, the specialized server software application sends a message to the set of property electronic devices (such as 540-542) indicating that they should be turned off or set to a predetermined configuration since the showing of the last appointment has ended. For instance, in such a case, the specialized server software application sends a message a smart thermostat to set the room temperature to a predetermined level, which can be set by the property owner. To determine whether the showing appointment is the last showing appointment scheduled for the day of the showing appointment of the listing 570, the specialized server software application may first access the database 584 to retrieve all showing appointments scheduled for the listing 570 on this day, and then check whether the present showing appointment is the last one.

At 318, the specialized server software application sends a message to the appointment contact mobile device 508 indicating that the showing has ended. Therefore, the appointment contact 504 (such as a homeowner) can return to the property 570. This appointment contact notification is sent without seeking confirmation from the showing agent 502 that the showing has ended. Such confirmation is not reliable since showing agents oftentimes do not respond to such inquiries, and even when they respond, their responses may well not be timely. The process 300 allows the specialized server 582 to accurately and timely determine that a showing has concluded because it relies on multiple factors, such as the showing appointment, the geo-fence and the key controller access.

Referring to FIG. 4, a flowchart depicting a process by which the specialized server software application determines that a showing corresponding to a showing appointment has ended based on the showing appointment and the geo-fence data. At 402, the specialized server software application receives the notification from the showing agent mobile device 506. At 404, the specialized server software application determines that the showing corresponding to the showing appointment has concluded based on the ending time of the showing appointment and the notification. For example, when the time of the notification and the ending time are within a predetermined range of time (such as ten or twenty-five minutes), the specialized server software application regards the showing as has been concluded.

The set of geo-fences 560-564 are also provided for reminding appointment contacts, which is further illustrated by reference to FIG. 9. Referring to FIG. 9, a flowchart depicting a process by which the specialized server reminds the appointment contact 504 that the showing agent 502 is approaching the listing 570 for showing is shown and generally indicated at 900. At 902, the specialized mobile software application running on the device 506 determines that the device 506 has breached the geo-fence 564. The outer geo-fence 564 has a larger radius, such as one thousand meters. At 904, the specialized mobile software application sends a message to the specialized server software application indicating that the device 506 has breached the geo-fence 564.

At 906, the specialized server software application receives the notification message. In response, at 906, the specialized server software application sends a message to the appointment contact mobile device 508 that the showing agent 502 is approaching the property 570. The message can be a push-notification, an Email message, a phone call, etc. The reminding message allows the appointment contact 504 to prepare for the showing. For example, the appointment contact 504 can leave the property 570, turn on a lighting system, turn on a sound system, turn on a fireplace, etc. Since the reminder is usually minutes before the arrival of the showing agent 502 with a prospect buyer, the appointment contact 504 does not have to leave to property 570 too early before the showing. Furthermore, the appointment contact 504 does not have to perform certain activities (such as turning a sound system) too early before the showing. Furthermore, the appointment contact 504 does not have to perform certain activities (such as turning a sound system) too early before the showing.

Figure 12:
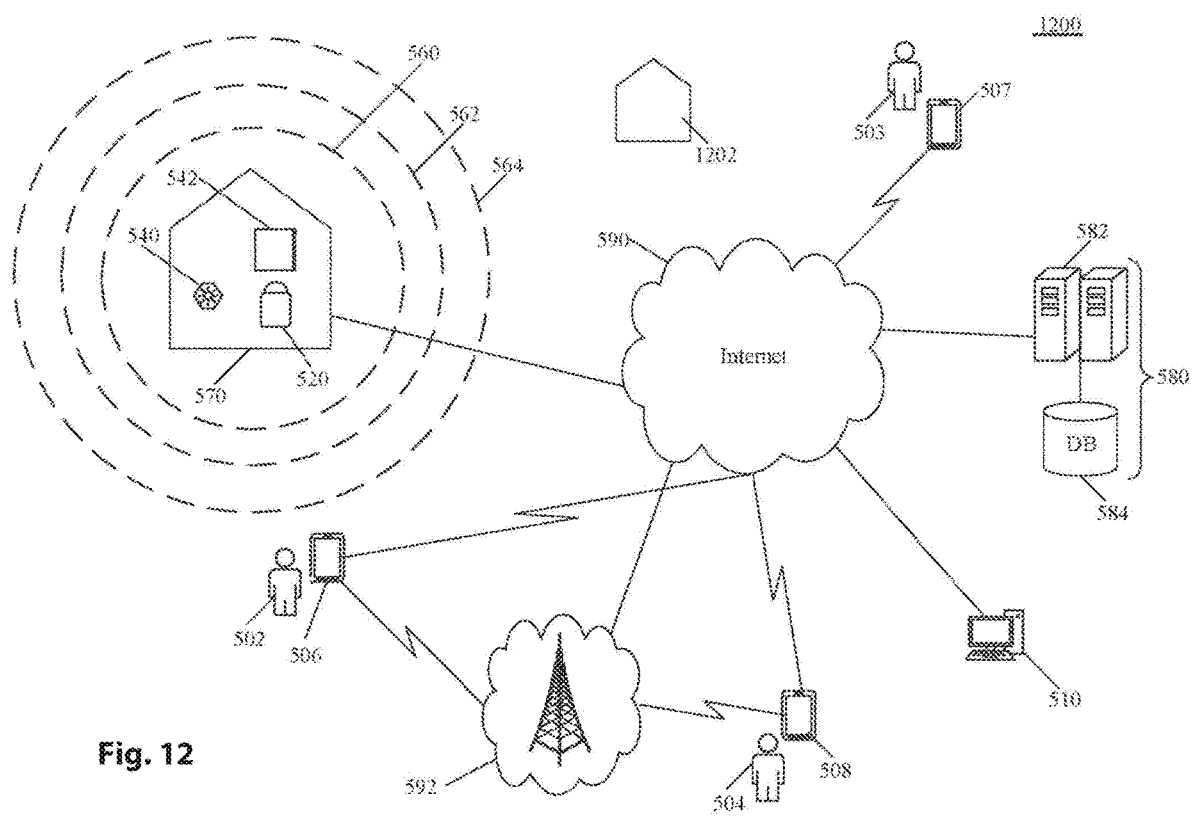
FIG. 12 is a simplified diagram depicting a communication system for managing real estate showings in accordance with the teachings of this disclosure.

For a particular showing appointment on the listing 570, the showing agent 502 may show the property 570 earlier or later than the showing appointment. For example, the showing agent 502 starts the showing at 2:20 PM for a showing appointment of 2:00 PM-2:30 PM on the day of this showing appointment. The showing is thus started late. It is later than the showing appointment's starting time of 2:00 PM. Suppose that another showing agent 503 (shown in FIG. 12 and operating a showing agent mobile device 507 running the specialized mobile software application) has a showing appointment on the listing 570 between 2:45 PM and 3:15 PM on the same day and arrives at the property 570 at 2:40 PM while the agent 502 is still showing the property 570. In such a case, the real estate showing appointment management system 582 automatically reschedule the subsequent showing appointment for the agent 503 and notifies both showing agent mobile devices 506 and 507.

Figure 13:
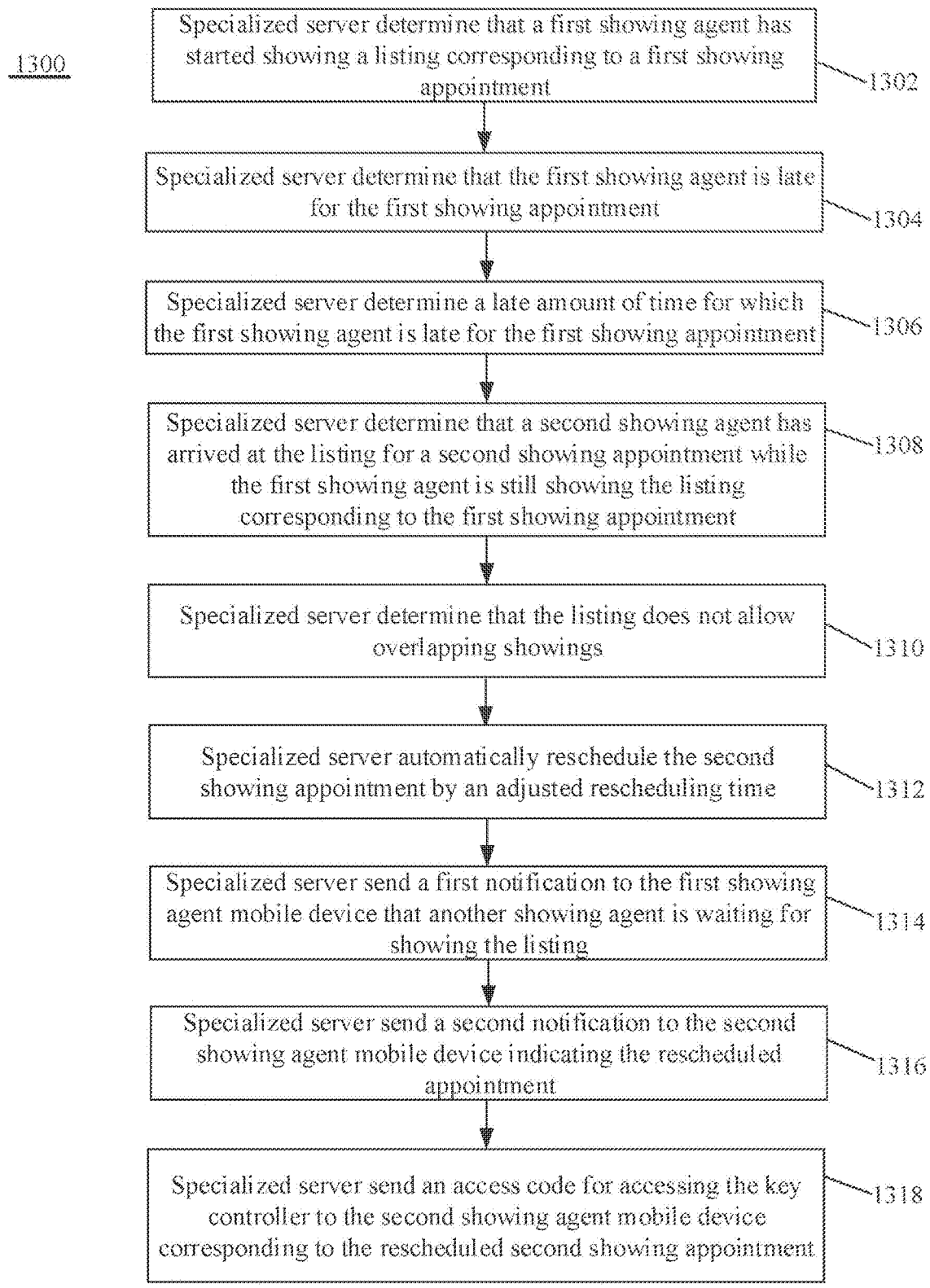
FIG. 13 is a flowchart illustrating a process by which a showing appointment management system automatically reschedules a subsequent showing appointment on a listing based on the real-time status of a previous showing appointment on the same listing in accordance with the teachings of this disclosure.

The automatic rescheduling is further illustrated by reference to FIG. 13. Referring now to FIG. 13, a flowchart illustrating a process by which the real estate showing appointment management system 582 automatically reschedules a subsequent showing appointment on a listing based on the real-time status of a previous showing appointment on the same listing is shown and generally indicated at 1300. At 1302, the specialized server software application determines that a first showing agent has started a showing of the listing 570 corresponding to a first showing appointment. For example, at 126, the specialized server software application determines that the showing agent 502 is at the listing 507 and has started a showing corresponding to the first showing appointment from 2:30 PM to 3:00 PM.

At 1304, the specialized server software application determines that the first showing agent is late for the first showing appointment. For example, the determination is made when the time of the geo-fence breach notification received at 106 from the device 506 is after the beginning time of the first showing appointment determined at 110. As another example, when the time of the showing starting notification message, received at 1102, is after the beginning time of the first showing appointment, the first showing agent is said to be late for the first showing appointment. The difference is the late amount of time and calculated at 1306. At 1308, the specialized server software application determines that a second showing agent has arrived at the listing 570 for a second showing appointment while the first showing agent 502 is still showing the listing 570. The second showing agent 503 is said to have arrived at the listing 570 when a corresponding geo-fence breaching notification is received at 106 from the device 507 If the arrival time is after the first agent's 502 arrival time and before the first agent's 502 showing is over, it is said that the second agent 503 arrives when the first agent 502 is still showing the listing 570 for the first showing appointment. Element determines whether the first agent's 502 showing is over. Alternatively, it is over when the current time is after the ending time of the first showing appointment plus the late amount of time.

At 1310, the specialized server software application determines that the listing 570 does not allow overlapping showings. In other words, at 1310, the specialized server software application determines that the listing 570 is configured to not allow two showing appointments do not have overlapping time. This limitation is configured and saved into the database 584. At 1312, the specialized server software application automatically reschedules the second showing appointment For example, when the showing agent 502 starts the first showing at 2:20 PM for the first showing appointment of 2:00 PM-2:30 PM and the showing agent 503 arrives at the listing 570 at 2:40 PM for the second showing appointment 2:45 PM-3:15 PM on the same day, the specialized server software application automatically reschedules the second showing appointment to 3:05 PM-3:35 PM by the late amount of time. Alternatively, rescheduled appointment is moved into the future by a fixed amount of time, such as 30 minutes. Both the late amount of time and the fixed amount of time for the rescheduling are referred herein as the adjusted rescheduling time. Furthermore, in certain situation, such as during a pandemic, some amount of separation time between two consecutive showing appointments is desired. In such a case, the adjusted rescheduling time is determined such that the time difference between the expected ending time of the first showing and the beginning time of the rescheduled second showing appointment is at least the predetermined separation time.

At 1314, the specialized server software application sends a first notification message to the showing agent device 506 that the second showing agent 503 is waiting for showing the listing 570. At 1316, the specialized server software application sends a second notification message to the showing agent device 507 of the rescheduled second showing appointment. At 1318, the specialized server software application sends an access code for accessing the key controller 520 to the second showing agent mobile device 507. The new access code corresponds to the rescheduled second showing appointment.

Figure 14:
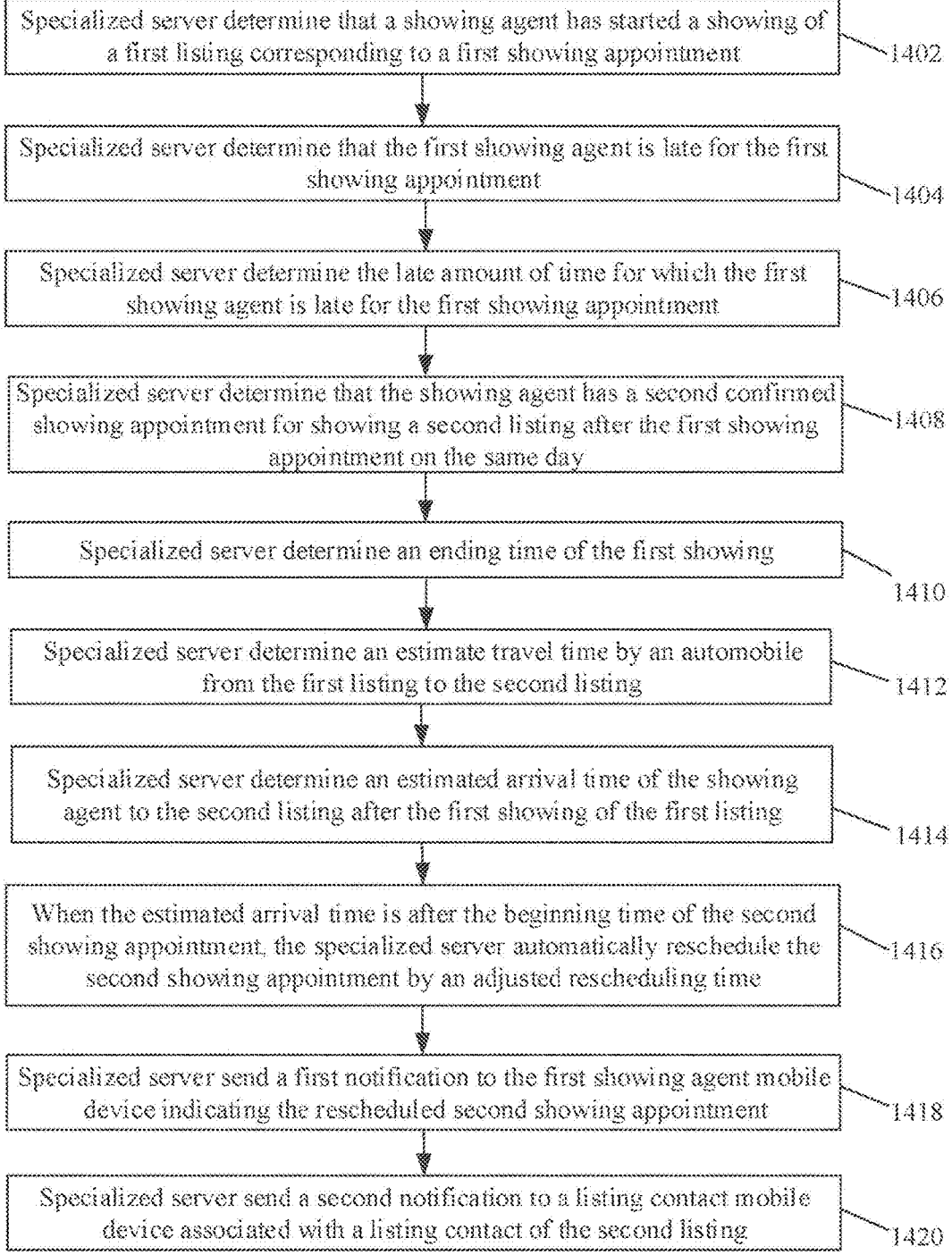
FIG. 14 is a flowchart illustrating a process by which a showing appointment management system automatically reschedules a subsequent showing appointment on a second listing based on the real-time status of a first showing appointment on a first listing in accordance with the teachings of this disclosure.

Turning to FIG. 14, a flowchart illustrating a process by which the real estate showing appointment management system 582 automatically reschedules a subsequent showing appointment on a second listing based on the real-time status of a previous showing appointment on a first listing is shown and generally indicated at 1400. At 1402, the specialized server software application determines that the showing agent 502 has started a showing of the listing 570 corresponding to a first showing appointment. For example, at 126, the specialized server software application determines that the showing agent 502 is at the listing 507 and has started a showing corresponding to the first showing appointment, such as one between 2:30-3:00 PM on a particular day.

At 1404, the specialized server software application determines that the showing agent 502 is late for the first showing appointment. For example, the determination is made when the time of the geo-fence breach notification received at 106 is after the beginning time of the first showing appointment determined at 110. The difference is the late amount of time and calculated at 1406. For instance, if the showing agent 502 arrives the listing 570 at 2:20 PM, she is 20 minutes late. At 1408, the specialized server software application determines that the showing agent has a confirmed second showing appointment for showing a second listing (such as the listing 1202 shown in FIG. 12) after the first showing appointment on the same day.

At 1410, the specialized server software application determines an ending time of the first showing corresponding to the first showing appointment. In one implementation, the ending time is the ending time of the first showing appointment, which is 3:00 PM in the above example, plus the late amount of time determined at 1406. In the example above, the estimated ending time is 3:20 PM. At 1412, the specialized server software application determines the estimate travel time by, for example, an automobile from the first listing to the second listing. It can be achieved by, for example, calling a commercial map service's API (application programming Interface) to determine the travel time. At 1414, the specialized server software application determines the estimated arrival time of the showing agent 502 to the second listing 1202 after she finishes the first showing of the listing 520. For instance, the estimated arrival time is the ending time of the first showing plus the estimated travel time.

At 1416, the specialized server software application automatically reschedules the second showing appointment by an adjusted rescheduling time when the estimated arrival time is after the beginning time of the second showing appointment. For example, when the estimated arrival time is 15 minutes after the beginning time of the second showing appointment, the second showing appointment is pushed into the future by 15 minutes, or a predetermined amount of time, such as 30 minutes. At 1418, the specialized server software application sends a first notification to the showing agent mobile device 506 indicating the rescheduled second showing appointment. At 1420, the specialized server software application sends a second notification to a listing contact, such as the listing agent and/or the homeowner of the second listing 1202, indicating that rescheduled second showing appointment.

Figure 15:
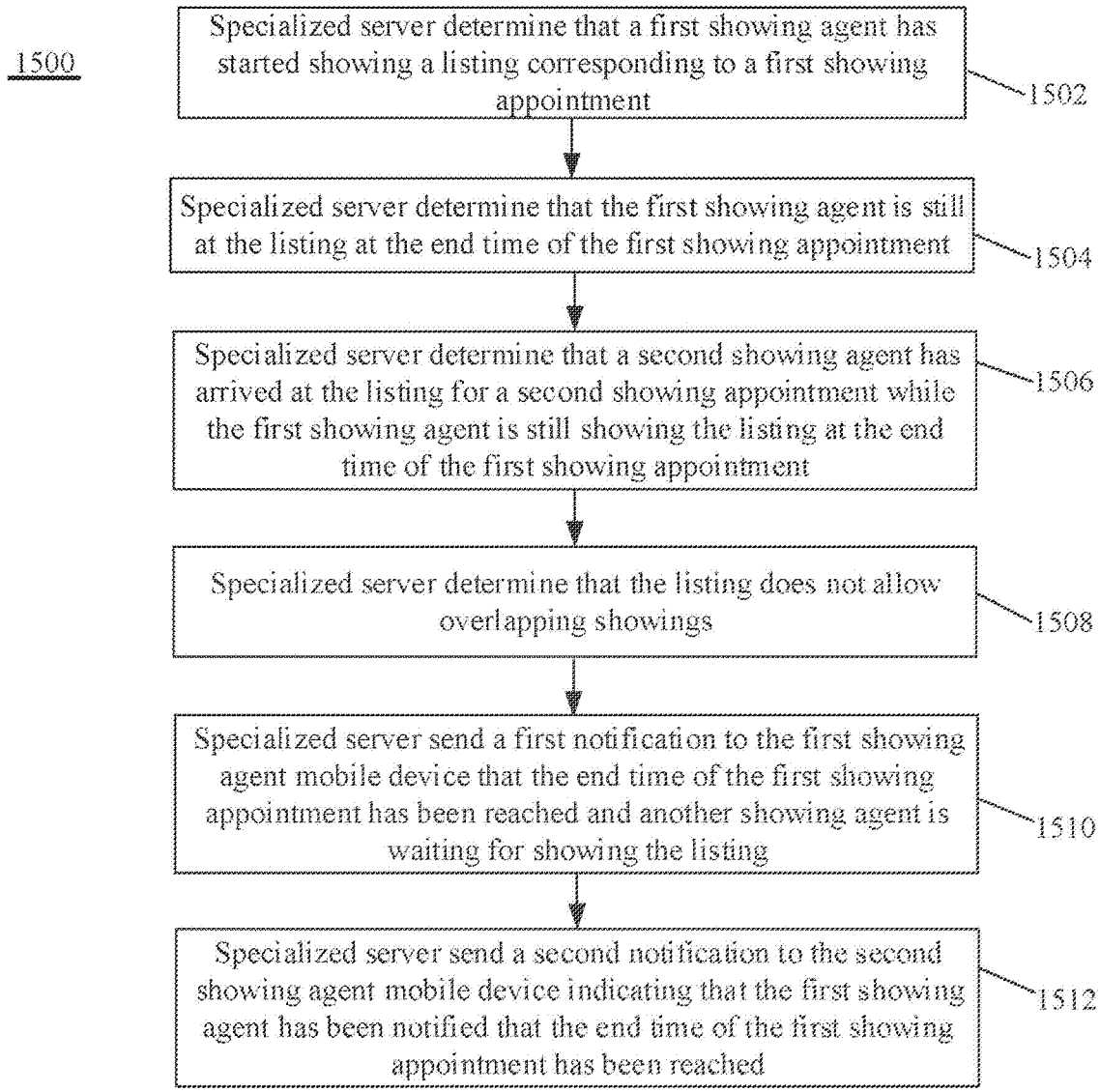
FIG. 15 is a flowchart illustrating a process by which a showing appointment management system automatically notifies showing agents when the end time of a first showing appointment has been reached in accordance with the teachings of this disclosure.

When a first showing agent is still showing a listing at the end time of a first showing appointment on the listing while a second showing agent has arrived at the listing for a second showing appointment on the same listing, the real estate showing appointment management system 582 automatically notifies the first showing agent mobile device 506 that the end time of the first showing appointment has come. It also sends a notification message to the second showing agent device 507 that the first showing agent 502 has been notified that the end time of the first showing appointment has been reached. The automatic notification process is further illustrated by reference to FIG. 15. Referring now to FIG. 15, a flowchart illustrating the process is shown and generally indicated at 1500. At 1502, the specialized server software application determines that a first showing agent has started a showing of the listing 570 corresponding to a first showing appointment. For example, at 126, the specialized server software application determines that the showing agent 502 is at the listing 507 and has started a showing corresponding to the first showing appointment from 2:30 PM to 3:00 PM.

At 1504, the specialized server software application determines that the first showing agent is still at the listing at or after the end time of the first showing appointment. For example, the determination is made when the specialized server software application does not receive a notification indicating that the geographical location of the first showing agent mobile device 506 is out of the geo-fence 560, 562 or 564 at or after the end time of the first showing appointment. At 1506, the specialized server software application determines that a second showing agent 503 has arrived at the listing 570 for a second showing appointment while the first showing agent 502 is still showing the listing 570 at or after the end time of the first showing appointment The second showing agent 503 is said to have arrived at the listing 570 when a corresponding geo-fence breaching notification is received at 106 from the device 507.

At 1508, the specialized server software application determines that the listing 570 does not allow overlapping showings. At 1510, the specialized server software application automatically sends a first notification to the first showing agent mobile device 506 that the end time of the first showing appointment has been reached and another showing agent is waiting for showing the listing 570. In a further implementation, at 1512, the specialized server software application automatically sends a second notification to the second showing agent mobile device 507 indicating that the first showing agent 502 has been notified that the end time of the first showing appointment has been reached.

Obviously, many additional modifications and variations of the present disclosure are possible in light of the above teachings. Thus, it is to be understood that, within the scope of the appended claims, the disclosure may be practiced otherwise than is specifically described above. For example, the specialized servers 582 can be a cloud server system or a server farm.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
receiving, by one or more computing devices, information about scheduled temporary access of a group of multiple indicated users to a physical property for an associated time period, wherein the physical property has a physical locking mechanism that controls access to at least a building on the physical property, wherein each of the multiple indicated users has an associated mobile device, wherein the scheduled temporary access further includes access criteria for providing of access information for the physical locking mechanism at the physical property that includes a defined proximity to the physical property and that further includes a time within a defined amount of the time period and that further includes one or more additional criteria, and wherein the physical property has a defined geofence for use with the scheduled temporary access that has a boundary around at least some of the physical property at a location corresponding to the defined proximity;
monitoring, by the one or more computing devices, locations of the associated mobile devices of the multiple indicated users based on global positioning system (GPS) data from the associated mobile devices;
determining, by the one or more computing devices and based at least in part on the GPS data from the associated mobile devices, that all of the multiple indicated users are within the defined proximity to the physical property at a current time within the defined amount of the time period, including determining, for each of the multiple indicated users, that the associated mobile device of that indicated user has breached the defined geofence at an indicated time before or at the current time;
determining, by the one or more computing devices, that the one or more additional criteria are satisfied based on further information provided for at least one of the multiple indicated users by the mobile device of each of the at least one indicated users;
determining, by the one or more computing devices and in response to the access criteria having been satisfied, to provide the access information for the physical locking mechanism to one or more of the indicated users, wherein the access information includes at least one access code that enables access to the physical property for the scheduled temporary access by unlocking the physical locking mechanism;
transmitting, by the one or more computing devices and in response to the determining to provide the access information, the access information to, for each of the one or more indicated users, the mobile device of that indicated user;
initiating, by the one or more computing devices, tracking of locations of the multiple indicated users at the physical property during the scheduled temporary access by one or more devices located at the physical property, the one or more devices including a beacon transmission device installed at a fixed location at the physical property and having a defined transmission range;
confirming, by the one or more computing devices, that the access information is used to access the physical property for the scheduled temporary access;
analyzing, by the one or more computing devices, information from the one or more devices about the tracked locations of the multiple indicated users at the physical property during the scheduled temporary access, including receiving data from at least one of the associated mobile devices that was transmitted to the at least one mobile device from the beacon transmission device, and determining for each of the multiple indicated users at least one amount of time that the tracked locations of that indicated user are within at least one area of the physical property, determining that at least one of the multiple indicated users has performed an unauthorized access to a restricted area of the physical property based at least in part on the received data from the at least one associated mobile device that was transmitted to the at least one mobile device from the beacon transmission device, and further including determining aggregate information for the multiple indicated users using at least some of the tracked locations of the multiple indicated users;
providing, by the one or more computing devices, at least the determined aggregate information for the multiple indicated users; and
initiating, by the one or more computing devices and in response to the determining that the at least one indicated user has performed the unauthorized access, a further automated corrective activity to prevent future unauthorized access to the restricted area.

2. The computer-implemented method of claim 1 wherein the one or more devices further include at least one additional device installed at a fixed location at the physical property and having capabilities to monitor locations in at least some of the physical property, the at least one additional device being at least one of a video camera or a still camera or a Wi-Fi transmission device or a motion-sensing device, and wherein the one or more devices further includes at least one mobile device that is associated with at least one of the multiple indicated users and that is executing a client application to perform at least one of gathering data using sensors of the mobile device that include at least visual data and analyzing the gathered data to determine a location of the mobile device within the physical property, or receiving transmitted signals by the mobile device from a Wi-Fi device at the physical property, or transmitting wireless signals from the mobile device to at least one receiver device at the physical property.

3. The computer-implemented method of claim 2 wherein the analyzing of the information about the tracked locations of the multiple indicated users further includes determining an area of the physical property that is of disinterest to the multiple indicated users based at least in part on spending a determined aggregate amount of time in that area that is below a defined disinterest threshold, and wherein the method further comprises initiating at least one further automated activity in response to the analyzing.

4. The computer-implemented method of claim 2 wherein the multiple indicated users further include at least one user to perform in-person review of the physical property during the scheduled temporary access, and at least one additional user to provide services at the physical property during the scheduled temporary access.

5. A computer-implemented method comprising:
receiving, by one or more computing devices, information about scheduled temporary access of an indicated user to a physical property for an associated time period, wherein the indicated user has an associated mobile device, wherein the physical property has a defined geofence around at least some of the physical property for use with the scheduled temporary access, and wherein the physical property has a physical locking mechanism that controls access to at least a building on the physical property;
determining, by the one or more computing devices and based at least in part on global positioning system (GPS) data from the mobile device, that the defined geofence has been breached by the mobile device of the indicated user at a time corresponding to the time period;
determining, by the one or more computing devices and in response to the determining that the defined geofence has been breached, to provide access information to the mobile device for the physical locking mechanism that enables access to the physical property for the scheduled temporary access by unlocking the physical locking mechanism, and transmitting the access information to the mobile device of the user;
tracking, by the one or more computing devices and after the determining that the defined geofence has been breached, movement of the mobile device on the physical property using data from one or more additional devices installed at the physical property that wirelessly transmit signals within a transmission radius, the tracking including obtaining information that the indicated user has entered a restricted area without authorization; and
providing, by the one or more computing devices, information about the tracked movement of the mobile device on the physical property, including confirming that the access information is used to access the physical property for the scheduled temporary access.

6. The computer-implemented method of claim 5 wherein the physical locking mechanism is a key controller associated with the physical property and the access information includes an access code for the key controller, and wherein the confirming that the access information is used to access the physical property for the scheduled temporary access includes receiving, by the one or more computing devices and from the key controller, a notification that the access code has been used with the key controller at an indicated time, the indicated time being within a defined amount of time from the time period.

7. The computer-implemented method of claim 6 wherein the access information further includes instructions for the indicated user to use in obtaining the access to the physical property for the scheduled temporary access, wherein the one or more computing devices include the mobile device and at least one other device, and wherein the method further comprises:
receiving, by the mobile device and from the at least one other device, the access information; and
presenting, by the mobile device and to the indicated user, at least the instructions, to further enable the access to the physical property for the scheduled temporary access.

8. The computer-implemented method of claim 5 wherein the one or more computing devices include the mobile device and at least one other device, and wherein the method further comprises, by the mobile device:
receiving, before the determining that the defined geofence has been breached, information about the defined geofence;
monitoring a current location of the mobile device based on the GPS data from the mobile device;
determining that the monitored current location of the mobile device has crossed a boundary of the defined geofence; and
transmitting a notification of crossing of the boundary by the mobile device to the at least other device, and wherein the determining that the defined geofence has been breached is performed at least in part by the at least one other device using the transmitted notification.

9. The computer-implemented method of claim 5 wherein the receiving of the information about scheduled temporary access of an indicated user to a physical property for an associated time period further comprises:
receiving, by the one or more computing devices, a request to schedule the temporary access of the indicated user to the physical property for the associated time period;
creating, by the one or more computing devices, one or more geofences around the physical property for the associated time period, the one or more geofences including the defined geofence;
notifying, by the one or more computing devices, the mobile device of the created one or more geofences; and
reserving, by the one or more computing devices, the time period for the physical property for use with the temporary access.

10. The computer-implemented method of claim 5 wherein the scheduled temporary access of the indicated user to the physical property further includes access criteria for providing of the access information to the mobile device that includes a defined proximity to the physical property and that further includes one or more additional criteria, and wherein the determining to provide the access information to the mobile device further comprises determining, by the one or more computing devices and before the providing of the access information, that all of the access criteria are satisfied.

11. The computer-implemented method of claim 10 wherein a boundary of the defined geofence is established to correspond to the defined proximity to the physical property, wherein the one or more additional criteria include one or more additional indicated users being present within the defined proximity to the physical property concurrent with the indicated user, and wherein the method further comprises determining, by the one or more computing devices, that the one or more additional indicated users are present within the defined proximity to the physical property concurrent with the indicated user based on at least one of determining for each of the one or more additional indicated users that an additional mobile device of that additional indicated user has breached the defined geofence, or receiving by at least one of the mobile device of the indicated user or a key controller at the physical property of additional access information for each of the one or more additional indicated users.

12. The computer-implemented method of claim 5 further comprising:
analyzing, by the one or more computing devices, information from the one or more additional devices about the tracked locations of the mobile device at the physical property that occur during the scheduled temporary access, including determining at least one amount of time that the tracked locations are within at least one area of the physical property; and
providing, by the one or more computing devices, the determined at least one amount of time for the at least one area of the physical property for further use.

13. The computer-implemented method of claim 5 wherein the physical property is available for acquisition, and wherein the indicated user is at least one of a potential acquirer user, or a buyer agent user representing the potential acquirer user, or a listing agent user representing an owner of the physical property, or a user to provide services at the physical property during the scheduled temporary access.

14. A system comprising:
one or more hardware processors of one or more computing devices; and
one or more memories with stored instructions that, when executed by at least one of the one or more hardware processors, cause at least one of the one or more computing devices to perform automated operations including at least:
receiving information about scheduled temporary access of an indicated user to a physical property for an associated time period, wherein the indicated user has an associated mobile device, wherein the physical property has a physical locking mechanism that controls access to at least a building on the physical property, and wherein the physical property has a defined geofence around at least some of the physical property for use with the scheduled temporary access;
determining, based at least in part on global positioning system (GPS) data from the mobile device, that the defined geofence has been breached by the mobile device of the indicated user at a time corresponding to the time period, and providing, in response to the determining that the defined geofence has been breached, access information physical property to the mobile device for the physical locking mechanism that enables access to the physical property for the scheduled temporary access by unlocking the physical locking mechanism;
initiating tracking of locations of the indicated user at the physical property during the scheduled temporary access by one or more devices at the physical property, the one or more devices including a beacon transmission device installed at a fixed location at the physical property that wirelessly transmit signals within a transmission radius;
analyzing information from the one or more devices about the tracked locations of the indicated user at the physical property during the scheduled temporary access, and determining at least one amount of time that the tracked locations of the indicated user are within at least one area of the physical property, including identifying a restricted area of the physical property to which the indicated user has performed an unauthorized access;
providing the determined at least one amount of time for the at least one area of the physical property for further use; and
initiating, in response to the identifying of the restricted area of the physical property to which the indicated user has performed the unauthorized access, a further automated corrective activity to address the unauthorized access.

15. The system of claim 14 wherein the one or more devices include at least one additional device installed at a fixed location at the physical property and having capabilities to monitor locations in at least some of the physical property, and wherein the initiating of the tracking of the locations of the indicated user at the physical property includes at least one of providing instructions to begin the tracking of the locations or requesting tracking information corresponding to the time period.

16. The system of claim 15 wherein the at least one additional device includes at least one of a video camera or a still camera or a Wi-Fi transmission device or a motion-sensing device.

17. The system of claim 14 wherein the one or more devices include at least the mobile device of the indicated user, and wherein the tracking of the locations of the indicated user at the physical property includes at least one of gathering data using sensors of the mobile device that include at least visual data and analyzing the gathered data to determine a location of the mobile device within the physical property, or receiving transmitted signals by the mobile device from the beacon device at the physical property, or transmitting wireless signals from the mobile device to at least one receiver device at the physical property.

18. The system of claim 17 wherein the initiating of the tracking of the locations of the indicated user at the physical property includes providing corresponding instructions to a client application executing on the mobile device to perform the at least one of the gathering of the data or the receiving of the transmitted signals or the transmitting of the wireless signals.

19. The system of claim 14 wherein at least one of the one or more devices performs tracking operations on a substantially constant basis that has begun before the determining that the defined geofence has been breached, and wherein the initiating of the tracking of the locations of the indicated user at the physical property includes, after the scheduled temporary access has ended, gathering the information from the one or more devices about the tracked locations of the indicated user at the physical property during the scheduled temporary access.

20. The system of claim 14 wherein the analyzing of the information about the tracked locations of the indicated user includes identifying an area of the physical property that is of disinterest to the indicated user based at least in part on spending a determined amount of time in that area that is below a defined disinterest threshold, and wherein the automated operations further includes initiating a further automated activity in response to the analyzing.

21. The system of claim 14 wherein the scheduled temporary access of the indicated user to the physical property for the associated time period is further for a group of multiple users whose locations are tracked at the physical property during the scheduled temporary access, wherein the analyzing of the information about the tracked locations of the indicated user further includes analyzing the tracked locations of the multiple users to determine an area of the physical property that is of disinterest to the multiple users based at least in part on spending a determined aggregate amount of time in that area that is below a defined disinterest threshold, or that the multiple users access the restricted area despite being unauthorized to enter the restricted area, or aggregate movement patterns of the multiple users in the physical property, and wherein the automated operations further includes initiating a further automated activity in response to the analyzing.

22. The system of claim 14 wherein the tracking of the locations is further performed for multiple users participating in multiple scheduled temporary accesses to the physical property for multiple time periods, wherein the analyzing of the information about the tracked locations of the indicated user further includes analyzing the tracked locations of the multiple users to determine at least one of an area of the physical property that is of disinterest to the multiple users based at least in part on spending a determined aggregate amount of time in that area that is below a defined disinterest threshold, or that the multiple users access the restricted area despite being unauthorized to enter the restricted area, or aggregate movement patterns of the multiple users in the physical property, and wherein the automated operations further includes initiating a further automated activity in response to the analyzing.

23. The system of claim 14 wherein the stored instructions include software instructions that, when executed, cause the at least one computing device to perform further automated operations including:
  determining, in response to the determining that the defined geofence has been breached, to provide the access information to the mobile device that enables access to the physical property for the scheduled temporary access, the access information including at least one access code for unlocking the physical locking mechanism;
  transmitting the access information to the mobile device of the user; and
  confirming that the access information is used to access the physical property for the scheduled temporary access.

24. The system of claim 14 wherein the one or more computing devices include the mobile device, and wherein at least one of the determining that the defined geofence has been breached or the tracking of the locations is performed at least in part by the mobile device.

25. A non-transitory computer-readable medium having stored contents that cause one or more computing devices to perform automated operations including at least:
  receiving, by the one or more computing devices, information about scheduled temporary access of multiple indicated users to a physical property for an associated time period, wherein the multiple indicated users have multiple associated mobile devices, wherein the physical property has a physical locking mechanism that controls access to at least a building on the physical property, and wherein the physical property has a defined geofence around at least some of the physical property for use with the scheduled temporary access;
  determining, by the one or more computing devices and based at least in part on global positioning system (GPS) data from the multiple mobile devices, that the defined geofence has been breached by the multiple indicated users by a time corresponding to the time period;
  determining, by the one or more computing devices and in response to the determining that the defined geofence has been breached by the multiple indicated users, to provide access information to at least one of the multiple indicated users for the physical locking mechanism that enables access to the physical property for the scheduled temporary access by unlocking the physical locking mechanism, and transmitting the access information to, for each of the at least one indicated users, the associated mobile device of that indicated user;
  tracking, by the one or more computing devices and after the determining that the defined geofence has been breached by the multiple indicated users, movement of the multiple indicated users on the physical property using data from one or more additional devices installed at the physical property that wirelessly transmit signals within a transmission radius, the tracking including obtaining information that one or more of the multiple indicated user has entered a restricted area without authorization; and
  providing, by the one or more computing devices, information about the tracked movement on the physical property, including confirming that the access information is used to access the physical property for the scheduled temporary access.

26. The non-transitory computer-readable medium of claim 25 wherein the physical property is available for acquisition, wherein the multiple indicated users include at least one potential acquirer user and at least one agent user representing the at least one potential acquirer user.

27. The non-transitory computer-readable medium of claim 26 wherein the multiple indicated users further include at least one user to provide services at the physical property during the scheduled temporary access, and wherein the stored contents include software instructions that, when executed, cause the one or more computing devices to perform further automated operations including analyzing information about aggregate activities of two or more of the multiple indicated users during the scheduled temporary access, and providing information about results determined from the analyzing.

* * * * *

UNITED STATES PATENT AND TRADEMARK OFFICE
CERTIFICATE OF CORRECTION

PATENT NO. : 11,954,650 B2
APPLICATION NO. : 18/092271
DATED : April 9, 2024
INVENTOR(S) : Michael P. Caputo et al.

It is certified that error appears in the above-identified patent and that said Letters Patent is hereby corrected as shown below:

In the Claims

Column 31, Line 53, Claim 14:
"breached, access information physical property to" should read --breached, access information to--.

Signed and Sealed this
Fourteenth Day of May, 2024

Katherine Kelly Vidal
*Director of the United States Patent and Trademark Office*